US008864297B2

(12) United States Patent
Ohishi et al.

(10) Patent No.: US 8,864,297 B2
(45) Date of Patent: *Oct. 21, 2014

(54) WATER-BASED INK SET FOR INK-JET RECORDING, INK-JET RECORDING METHOD AND INK-JET RECORDING APPARATUS

(71) Applicants: Ayako Ohishi, Nagoya (JP); Mitsunori Maeda, Nagoya (JP)

(72) Inventors: Ayako Ohishi, Nagoya (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 56 days.

This patent is subject to a terminal disclaimer.

(21) Appl. No.: 13/724,061

(22) Filed: Dec. 21, 2012

(65) Prior Publication Data

US 2013/0182054 A1 Jul. 18, 2013

(30) Foreign Application Priority Data

Jan. 18, 2012 (JP) ................................. 2012-008526

(51) Int. Cl.
*C09D 11/00* (2014.01)
*C09D 11/326* (2014.01)
*C09D 11/32* (2014.01)

(52) U.S. Cl.
CPC .............. *C09D 11/32* (2013.01); *C09D 11/326* (2013.01)
USPC ....................................................... 347/100

(58) Field of Classification Search
USPC .......................................................... 347/100
See application file for complete search history.

(56) References Cited

U.S. PATENT DOCUMENTS

| 7,871,464 | B2 | 1/2011 | Ono et al. | |
|---|---|---|---|---|
| 8,016,404 | B2 | 9/2011 | Kato et al. | |
| 2008/0241398 | A1 | 10/2008 | Kato et al. | |
| 2010/0209678 | A1 | 8/2010 | Ono et al. | |
| 2011/0128333 | A1 | 6/2011 | Goto et al. | |
| 2011/0306708 | A1* | 12/2011 | Hiraishi et al. | 524/90 |
| 2012/0081452 | A1* | 4/2012 | Maeda et al. | 347/20 |
| 2012/0081453 | A1* | 4/2012 | Tsuzaka et al. | 347/20 |
| 2013/0053495 | A1* | 2/2013 | Okuda et al. | 524/354 |

FOREIGN PATENT DOCUMENTS

| JP | 2003-176353 | 6/2003 |
|---|---|---|
| JP | 2008-246821 | 10/2008 |
| JP | 4228498 | 2/2009 |
| JP | 2011-111611 | 6/2011 |
| WO | 2009/060654 | 5/2009 |

* cited by examiner

Primary Examiner — Laura Martin
(74) Attorney, Agent, or Firm — Banner & Witcoff, Ltd.

(57) ABSTRACT

A water-based ink set for ink-jet recording includes two or more kinds of water-based inks; wherein at least one water-based ink among the two or more kinds of water-based inks contains a dye represented by a general formula (1) and at least one water-based inks contains 0.5% by weight to 4% by weight of a cationic polymer; and in the general formula (1): $n_1$ is 1 or 2, each of three Ms is sodium or ammonium and the three Ms may be same or different from one another, and $R_0$ represents a monoalkylamino group substituted by a carboxyl group and having a number of carbon atoms of 1 to 8.

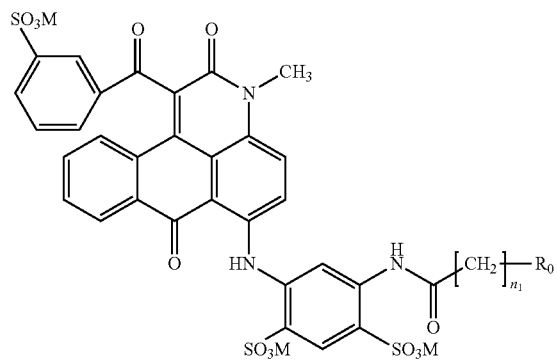
(1)
16 Claims, 1 Drawing Sheet

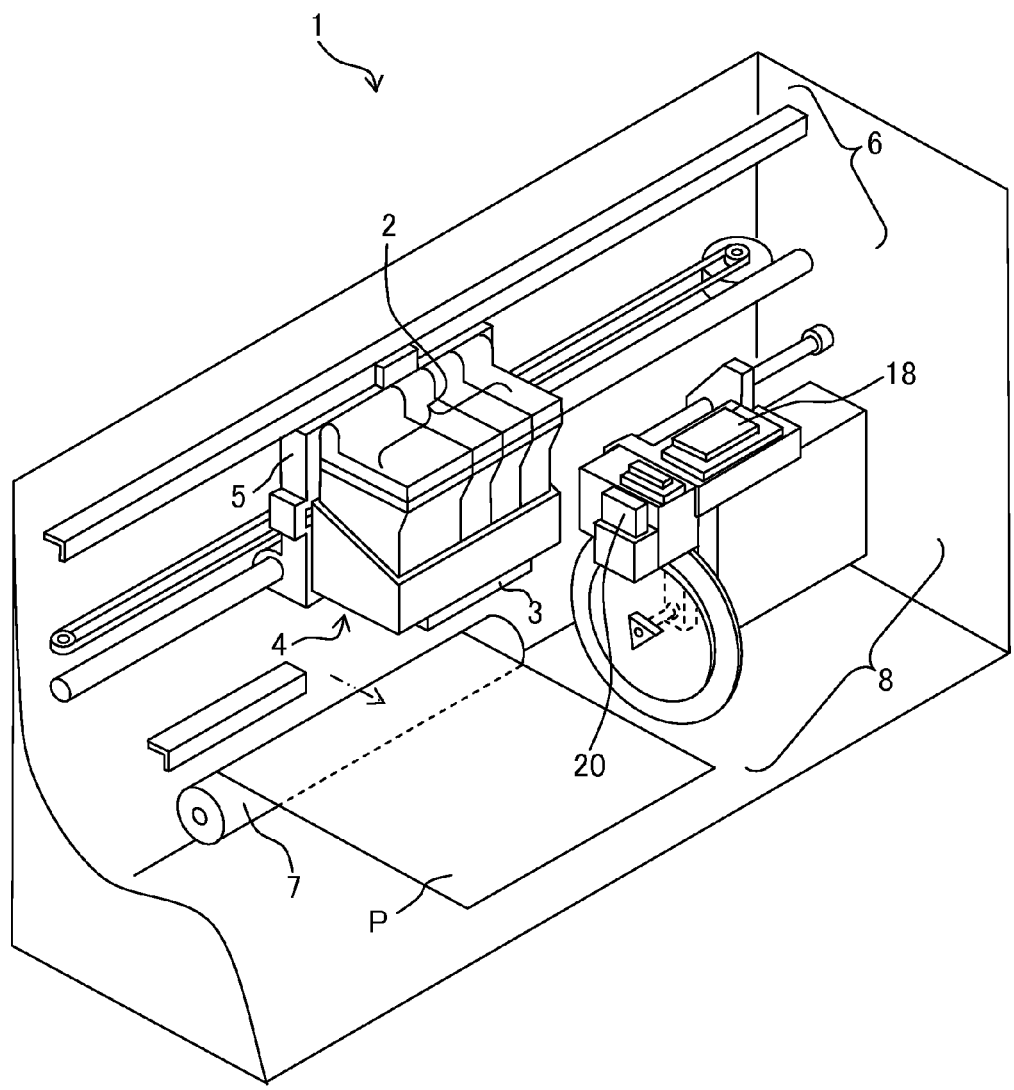

WATER-BASED INK SET FOR INK-JET RECORDING, INK-JET RECORDING METHOD AND INK-JET RECORDING APPARATUS

CROSS REFERENCE TO RELATED APPLICATION

The present application claims priority from Japanese Patent Application No. 2012-008526 filed on Jan. 18, 2012, the disclosure of which is incorporated herein by reference in its entirety.

BACKGROUND OF THE INVENTION

1. Field of the Invention

The present invention relates to a water-based ink set for ink-jet recording, an ink-jet recording method and an ink-jet recording apparatus.

2. Description of the Related Art

In general, it is demanded for a water-based ink set for ink-jet recording that the hue is satisfactory and the durability or stoutness is excellent against light, heat, and ozone. A water-based ink set, which includes a water-based ink using a specific dye, has been suggested as the water-based ink set for ink-jet recording in which the hue is satisfactory and the durability or stoutness is excellent against light, heat, and ozone. See, for example, Japanese Patent Application Laid-open No. 2011-111611 (corresponding to United States Patent Application Publication No. US 2011/0128333).

However, some types of the specific dye as described above tend to cause the change in the easiness of diffusion into a recording medium depending on change in an environmental condition under which the specific dye is used, as compared with general dyes. For example, the humidity affects the easiness of diffusion of the specific dye into the recording medium. For this reason, for example, in a case that a water-based magenta ink, which contains the specific dye, is mixed with a water-based yellow ink and a water-based cyan ink on the recording medium to perform recording with a process black (also referred to as "tri-color black" or "composite black"), then the color tone of magenta is weakened in the process black due to the diffusion of the specific dye in a high humidity environment, and the achromatic color (for example, a color within a range of gradation from the black color (black) to the gray color (gray)) appears as if the achromatic color is greenish.

In view of the above, an object of the present teaching is to provide a water-based ink set for ink jet recording which provides a satisfactory hue, which is excellent in the durability or stoutness against light, heat, and ozone, and which makes it possible to suppress the color change of a secondary color (color prepared by mixing two or more water-based inks of different colors) on a recording medium in a high humidity environment.

SUMMARY OF THE INVENTION

According to a first aspect of the present teaching, there is provided a water-based ink set for ink-jet recording, including at least two kinds of water-based inks each of which contains a colorant, water, and a water-soluble organic solvent;

wherein at least one water-based ink, among the at least two kinds of water-based inks, contains a dye represented by a general formula (1) as the colorant and at least one water-based ink among the at least two kinds of water-based inks contains 0.5% by weight to 4% by weight of a cationic polymer:

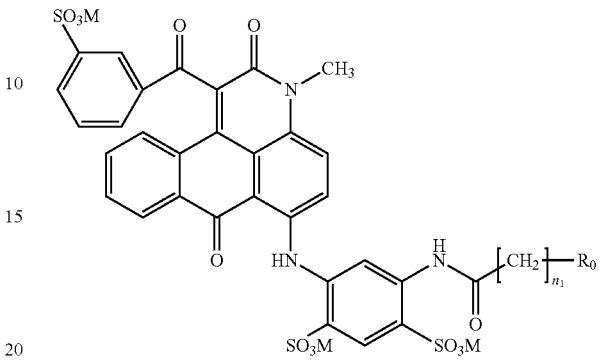

(1)

in the general formula (1):

$n_1$ is 1 or 2, each of three Ms is sodium or ammonium and the three Ms may be same or different from one another, and $R_0$ represents a monoalkylamino group substituted by a carboxyl group and having a number of carbon atoms of 1 to 8.

According to a second aspect of the present teaching, there is provided an ink-jet recording method for performing recording on a recording medium, the method including: preparing the water-based ink set for ink-jet recording of the first aspect; and discharging, onto the recording medium, a water-based ink of the water-based ink set.

According to a third aspect of the present teaching, there is provided an ink-jet recording apparatus which performs recording on a recording medium, the apparatus including an ink-set accommodating section which accommodates the water-based ink set of the first aspect; and an ink discharging mechanism which discharges, onto the recording medium, a water-based ink of the water-based ink set.

BRIEF DESCRIPTION OF THE DRAWINGS

FIG. 1 shows a schematic perspective view illustrating an exemplary construction of an ink-jet recording apparatus according to the present teaching.

DESCRIPTION OF THE PREFERRED EMBODIMENTS

<Water-Based Ink Set for Ink-Jet Recording>

An explanation will be made about an embodiment of the water-based ink set for ink-jet recording (hereinafter referred to as "water-based ink set" or "ink set" in some cases) of the present teaching. However, the embodiment described below is described merely exemplarily, and the present teaching is not limited to this.

In the water-based ink set for ink-jet recording of the present teaching, at least one of following Conditions (I) and (II) is fulfilled:

Condition (I): the dye represented by the general formula (1) is blended or contained in at least one water-based ink among the two or more water-based inks (two or more kinds of water-based inks) and the cationic polymer is blended or contained in at least one different water-based ink, among the two or more water-based inks, which is different from the at least one water-based ink containing the dye represented by the general formula (1);

Condition (II): both the dye represented by the general formula (1) and the cationic polymer are contained in a same ink among the two or more water-based inks.

<First Embodiment>

This embodiment is in such a mode that the dye represented by the general formula (1) and the cationic polymer are blended in different water-based inks respectively, i.e., a mode which fulfills Condition (I) described above. In this embodiment, the water-based ink for ink-jet recording (hereinafter referred to as "water-based ink" or "ink" in some cases), which contains the dye represented by the general formula (1), is designated as "first water-based ink", and the water-based ink, in which the cationic polymer is blended, is designated as "second water-based ink".

[First Water-Based Ink]

The first water-based ink contains a colorant, water, and a water-soluble organic solvent. The colorant of the first water-based ink contains the dye represented by the general formula (1).

The dye represented by the general formula (1) may be a compound in which the three Ms are all sodium (sodium salt), may be a compound in which the three Ms are all ammonium (ammonium salt) or may be a compound in which one M or two Ms among the three Ms is/are sodium and the remaining two Ms or one M are/is ammonium. The dye represented by the general formula (1) may be composed of a single compound among the compounds described above, or may be a mixture containing two or more kinds of the compounds described above. The M may be electrolyzed in the first water-based ink to be an ion (at least one of $Na^+$ and $NH_4^+$).

Specific preferred examples of the dye represented by the general formula (1) may includes compounds represented by dyes (1-A) to (1-E) shown in the following Table 1.

TABLE 1

| | $n_1$ | M | $R_0$ |
|---|---|---|---|
| Dye (1-A) | 1 | Mixture of Na and $NH_4$ | —$NHCH_2COOH$ |
| Dye (1-B) | 1 | Mixture of Na and $NH_4$ | —$NH(CH_2)_5COOH$ |
| Dye (1-C) | 1 | Mixture of Na and $NH_4$ | —$NH(CH_2)_7COOH$ |
| Dye (1-D) | 2 | Mixture of Na and $NH_4$ | —$NHCH_2COOH$ |
| Dye (1-E) | 2 | Mixture of Na and $NH_4$ | —$NH(CH_2)_5COOH$ |

The dye represented by the general formula (1) can be produced, for example, by the method disclosed in United States Patent Application Publication No. US 2012/0081453 of which content or disclosure is incorporated herein by reference in its entity as constructing a part of the present specification.

The blending amount of the dye represented by the general formula (1) with respect to the total amount of the first water-based ink is not specifically limited. By making the dye represented by the general formula (1) be contained, it is possible to obtain a water-based ink which provides the satisfactory hue and which is excellent in the durability or stoutness against light, heat, and ozone. The blending amount of the dye represented by the general formula (1) with respect to the total amount of the first water-based ink is, for example, 0.1% by weight to 10% by weight, preferably 0.5% by weight to 8% by weight, and more preferably 1% by weight to 6% by weight.

The colorant of the first water-based ink may further contain, for example, any other dye and any pigment in addition to the dye represented by the general formula (1). Further, the colorant of the first water-based ink may contain only the dye represented by the general formula (1).

It is preferable that the water used for the first water-based ink is ion exchange water or pure water (purified water). The blending amount of water (water ratio) with respect to the total amount of the first water-based ink is, for example, 10% by weight to 90% by weight, and preferably 40% by weight to 80% by weight. The water ratio may be, for example, the balance of the other components.

The water-soluble organic solvent of the first water-based ink is exemplified, for example, by a humectant which prevents the water-based ink from being dried at a tip or forward end portion of a nozzle of an ink-jet head and a penetrant which adjusts the drying speed on the recording medium.

The humectant described above is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyhydric alcohols such as polyalkylene glycol, alkylene glycol, glycerol and trimethylolpropane; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylene glycol, diethylene glycol, triethylene glycol, dipropylene glycol, tripropylene glycol, thiodiglycol, and hexylene glycol. One type (kind) of the humectant as described above may be used singly, or two or more types (kinds) of the humectants as described above may be used in combination. Among them, it is preferable to use polyhydric alcohol such as alkylene glycol and glycerol.

The blending amount of the humectant with respect to the total amount of the first water-based ink is, for example, 0% by weight to 95% by weight, preferably 5% by weight to 80% by weight, and more preferably 5% by weight to 50% by weight.

The penetrant includes, for example, glycol ether. Glycol ether includes, for example, ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type (kind) of the penetrant as described above may be used singly, or two or more types (kinds) of the penetrants as described above may be used in combination.

The blending amount of the penetrant with respect to the total amount of the first water-based ink is, for example, 0% by weight to 20% by weight, preferably 0.1% by weight to 15% by weight, and more preferably 0.5% by weight to 10% by weight.

The first water-based ink may further contain conventionally known additives, if necessary. The additive includes, for example, surfactants, pH-adjusting agents, viscosity-adjusting agents, surface tension-adjusting agents, and fungicides.

The viscosity-adjusting agent includes, for example, polyvinyl alcohol, cellulose, and water-soluble resin.

The first water-based ink can be prepared, for example, such that the colorant, water, the water-soluble organic solvent, and optionally other additive component(s) as necessary are mixed uniformly or homogeneously by any conventionally known method, and undissolved matters are removed by a filter or the like.

The first water-based ink can be used, for example, as a water-based magenta ink. However, the present teaching is not limited to this. The first water-based ink can be also provided as a water-based ink having a color other than magenta, by using a colorant other than the dye represented by the general formula (1).

[Second Water-Based Ink]

The second water-based ink contains a colorant, water, and a water-soluble organic solvent.

The colorant of the second water-based ink may be either a dye or a pigment. The dye and the pigment may be mixed and used as the colorant of the second water-based ink. The pigment is not specifically limited, for which it is possible to use, for example, an inorganic pigment, and an organic pigment. In a case that the pigment is used, it is allowable to use a dispersant in combination with the pigment, or to use a self-dispersible pigment.

The dye is not specifically limited, which is exemplified, for example, by direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black is exemplified, for example, by C. I. Direct Blacks 17, 19, 32, 51, 71, 108, 146, 154, and 168. C. I. Direct Blue is exemplified, for example, by C. I. Direct Blues 6, 22, 25, 71, 86, 90, 106, and 199. C. I. Direct Red is exemplified, for example, by C. I. Direct Reds 1, 4, 17, 28, 83, and 227. C. I. Direct Yellow is exemplified, for example, by C. I. Direct Yellows 12, 24, 26, 86, 98, 132, 142, and 173. C. I. Direct Orange is exemplified, for example, by C. I. Direct Oranges 34, 39, 44, 46, and 60. C. I. Direct Violet is exemplified, for example, by C. I. Direct Violets 47 and 48. C. I. Direct Brown is exemplified, for example, by C. I. Direct Brown 109. C. I. Direct Green is exemplified, for example, by C. I. Direct Green 59. C. I. Acid Black is exemplified, for example, by C. I. Acid Blacks 2, 7, 24, 26, 31, 52, 63, 112, and 118. C. I. Acid Blue is exemplified, for example, by C. I. Acid Blues 9, 22, 40, 59, 93, 102, 104, 117, 120, 167, 229, and 234. C. I. Acid Red is exemplified, for example, by C. I. Acid Reds 1, 6, 32, 37, 51, 52, 80, 85, 87, 92, 94, 115, 180, 256, 289, 315, and 317. C. I. Acid Yellow is exemplified, for example, by C. I. Acid Yellows 11, 17, 23, 25, 29, 42, 61, and 71. C. I. Acid Orange is exemplified, for example, by C. I. Acid Oranges 7 and 19. C. I. Acid Violet is exemplified, for example, by C. I. Acid Violet 49. C. I. Basic Black is exemplified, for example, by C. I. Basic Black 2. C. I. Basic Blue is exemplified, for example, by C. I. Basic Blues 1, 3, 5, 7, 9, 24, 25, 26, 28, and 29. C. I. Basic Red is exemplified, for example, by C. I. Basic Reds 1, 2, 9, 12, 13, 14, and 37. C. I. Basic Violet is exemplified, for example, by C. I. Basic Violets 7, 14, and 27. C. I. Food Black is exemplified, for example, by C. I. Food Blacks 1 and 2. Other than these dyes, for example, compounds, which are represented by chemical formulas (Ya) to (Ye) and chemical formulas (Ca) to (Ce) used in Examples described later on, can be also preferably used as the dye.

The blending amount of the dye with respect to the total amount of the second water-based ink is not specifically limited, which is, for example, 0.1% by weight to 20% by weight and preferably 0.3% by weight to 10% by weight.

One type (kind) of the colorant of the second water-based ink may be used singly. Alternatively, two or more types (kinds) of the colorants may be used in combination.

The blending amount of the solid content of the pigment with respect to the total amount of the second water-based ink (pigment solid content amount) is not specifically limited, which can be appropriately determined depending on, for example, the desired optical density and/or the desired coloration or colorfulness. The pigment solid content amount is, for example, 0.1% by weight to 20% by weight, preferably 1% by weight to 10% by weight, and more preferably 2% by weight to 8% by weight. It is allowable to add a dispersant when the pigment is used.

The water and the water-soluble organic solvent, which are used for the second water-based ink, are same as or equivalent to the water and the water-soluble organic solvent which are used for the first water-based ink.

The second water-based ink further contains the cationic polymer. It is estimated that the color change of the secondary color on the recording medium is suppressed in the high humidity environment by containing the cationic polymer. In particular, in a case that a glossy paper having silica particles on a surface of the glossy paper is used as the recording medium, it is estimated that the filling effect is exerted by the interaction between the cationic polymer and an ink-receiving layer composed, for example, of the silica particles on the glossy paper, thereby suppressing the change of the easiness of diffusion (migration) of the dye on the glossy paper which is caused depending on the humidity, and the color change of the secondary color on the recording medium is consequently suppressed. Further, it is also estimated that the filling effect is exerted by the interaction between cationic portions of the cationic polymer and anionic portions of the dye, that is, an ionic bond. However, the present teaching is not limited to the estimations.

It is preferable that the cationic polymer is at least one compound among a compound represented by following general formula (2), a compound represented by the general formula (3), a compound represented by the general formula (4), and a compound (polyethyleneimine) represented by the general formula (5).

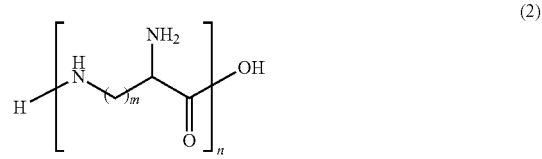

(2)

(3)

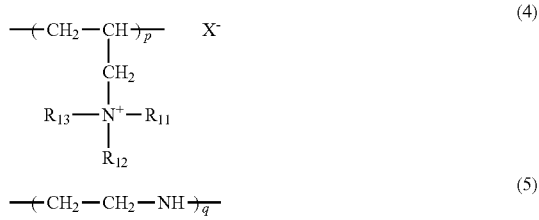

In the general formula (2), m is an integer of 2 to 6, and n is an integer of 20 to 40.

In the general formula (2), it is especially preferable that m is 4. In this case, the compound represented by the general formula (2) is polylysine. Polylysine can be produced by a method described, for example, in Japanese Patent No. 4228498, Japanese Patent Application Laid-open No. 2003-176353, etc. Further, in the general formula (2), it is preferable that n is 25 to 35.

The compound represented by the general formula (2) may include any derivative of the compound represented by the general formula (2). When any isomer, which includes, for example, tautomers and stereoisomers (for example, geometrical isomer, conformational isomer, and stereoisomer), exists in relation to the compound represented by the general formula (2) or the derivative thereof, any one of the isomers can be used for the present teaching. Salts of the compound represented by the general formula (2) and the derivative thereof can be also used for the present teaching in the same manner as described above. The salt may be either an acid addition salt or a base addition salt. The acid, which forms the acid addition salt, may be either an inorganic acid or an organic acid. The base, which forms the base addition salt, may be either an inorganic base or an organic base. The inorganic acid is not specifically limited. However, the inorganic acid is exemplified, for example, by hydrochloric acid, sulfuric acid, phosphoric acid, hydrofluoric acid, hydrobromic acid, hydroiodic acid, hypofluorous acid, hypochlorous acid, hypobromous acid, hypoiodous acid, fluorous acid, chlorous acid, bromous acid, iodous acid, fluoric acid, chloric acid, bromic acid, iodic acid, perfluoric acid, perchloric acid, perbromic acid, and periodic acid. The organic acid is not specifically limited as well. However, the organic acid is exemplified, for example, by glutamic acid, p-toluenesulfonic acid, methanesulfonic acid, oxalic acid, p-bromobenzenesulfonic acid, carbonic acid, succinic acid, citric acid, benzoic acid, acetic acid, hydroxycarboxylic acid, propionic acid, malonic acid, adipic acid, fumaric acid, and maleic acid. The inorganic base is not specifically limited. However, the inorganic base is exemplified, for example, by ammonium hydroxide, alkali metal hydroxide, alkaline earth metal hydroxide, carbonate, hydrogen carbonate, and sulfate. More specifically, the inorganic base is exemplified, for example, by sodium hydroxide, potassium hydroxide, potassium carbonate, sodium carbonate, sodium hydrogen carbonate, potassium hydrogen carbonate, calcium hydroxide, calcium carbonate, potassium sulfate, and calcium sulfate. The organic base is not specifically limited as well. However, the organic base is exemplified, for example, by alcoholamine, trialkylamine, tetraalkylammonium, and tris(hydroxymethyl)aminomethane. The alcoholamine is exemplified, for example, by ethanolamine. The trialkylamine is exemplified, for example, by trimethylamine, triethylamine, tripropylamine, tributylamine, and trioctylamine. The tetraalkylammonium is exemplified, for example, by tetramethylammonium, tetraethylammonium, tetrapropylammonium, tetrabutylammonium, and tetraoctylammonium.

In the general formulas (3) and (4), $R_{11}$ to $R_{13}$ are hydrogen atoms or organic groups respectively. The organic group is exemplified, for example, by alkyl group and aryl group. The alkyl group may have either straight chain or branched chain, which is exemplified, for example, by methyl group, ethyl group, n-propyl group, isopropyl group, n-butyl group, isobutyl group, sec-butyl group, tert-butyl group, n-hexyl group, cyclohexyl group, n-octyl group, 2-ethylhexyl group, n-decyl group, n-dodecyl group, octadecyl group, 1,3-butadienyl group, and 1,3-pentadienyl group. The aryl group is exemplified, for example, by phenyl group, naphthyl group, tolyl group, and vinylphenyl group. The alkyl group and the aryl group may have any substituent. The alkyl group and the aryl group, which have the substituent, are exemplified, for example, by fluoroethyl group, trifluoroethyl group, methoxyethyl group, phenoxyethyl group, hydroxyphenylmethyl group, chlorophenyl group, dichlorophenyl group, trichlorophenyl group, bromophenyl group, iodophenyl group, fluorophenyl group, hydroxyphenyl group, methoxyphenyl group, cetoxyphenyl group, and cyanophenyl group.

In the general formula (4), $X^-$ is an anion. The anion may be any anion. However, the anion is exemplified, for example, by halide ion, sulfonic acid ion, alkylsulfonic acid ion, arylsulfonic acid ion, alkylcarboxylic acid ion, and arylcarboxylic acid ion.

In the general formulas (3) and (4), p is a positive integer, which is, for example, 10 to 400, preferably 15 to 300, and more preferably 20 to 200. The weight average molecular weight of each of the compounds represented by the general formulas (3) and (4) is not specifically limited. However, the weight average molecular weight is, for example, 600 to 20000, preferably 900 to 15000, and more preferably 1200 to 10000.

In the general formula (3), it is especially preferable that $R_{11}$ and $R_{12}$ are hydrogen atoms. In this case, the compound represented by the general formula (3) is polyallylamine. In the general formula (4), it is preferable that $R_{11}$ to $R_{13}$ are hydrogen atoms, and $X^-$ is chloride ion. In this case, the compound represented by the general formula (4) is polyallylamine hydrochloride (allylamine hydrochloride polymer).

In the general formula (5), q is a positive integer, which is, for example, 12 to 500, preferably 20 to 350, and more preferably 28 to 250. Straight chain polyethyleneimine is shown in the general formula (5). However, the cationic polymer may be polyethyleneimine having branched chain structure including primary, secondary, and tertiary amines. The weight-average molecular weight of the compound represented by the general formula (5) is not specifically limited. However, the weight-average molecular weight of the compound represented by the general formula (5) is, for example, 600 to 20000, preferably 900 to 15000, and more preferably 1200 to 10000.

It is also allowable to use those other than the compound represented by the general formula (2), the compound represented by the general formula (3), the compound represented by the general formula (4), and the compound represented by the general formula (5) as the cationic polymer. Further, it is allowable that the second water-based ink does not contain any cationic polymer other than the compound represented by the general formula (2), the compound represented by the general formula (3), the compound represented by the general formula (4), and the compound represented by the general formula (5). The cationic polymer other than the compound represented by the general formula (2), the compound represented by the general formula (3), the compound represented by the general formula (4), and the compound represented by the general formula (5) is exemplified, for example, by polyamine, polyvinylamine, polyvinylpyridine, polyethyleneimine-epichlorohydrin reaction product, polyimide-polyamine resin, polyamide-epichlorohydrin resin, cationic starch, polyvinyl alcohol, polyvinylpyrrolidone, polyamidine, cationic epoxy resin, polyacrylamide, polyacrylic acid ester, polymethacrylic acid ester, polyvinyl formamide, aminoacetalized polyvinyl alcohol, polyvinyl benzyl onium, dicyandiamide-formalin polycondensate, dicyandiamide-diethylenetriamine polycondensate, epichlorohydrin-dimethylamine addition polymer, dimethyldiallylammonium chloride-$SO_2$ copolymer, dimethyldiallylammonium chloride polymer, and derivatives thereof. Further, the cationic polymer other than the compound represented by the general formula (2), the compound represented by the general formula (3), the compound represented by the general formula (4), and the compound represented by the general formula (5) is also exemplified, for example, by a polymer of single monomer or a copolymer of a plurality of types of monomers composed of at least one of water-soluble monomers including, for example, dimethylaminoethyl methacrylate (DM), methacryloyloxyethyl trimethyl ammonium chloride (DMC), methacryloyloxyethyl benzyl dimethyl ammonium chloride (DMBC), dimethylaminoethyl acrylate (DA), acryloyloxyethyl trimethyl ammonium chloride (DMQ), acryloyloxyethyl benzyl dimethyl ammonium chloride (DABC), dimethylaminopropyl acrylamide (DMAPAA), and acrylamide propyl trimethyl ammonium chloride (DMAPAAQ).

The cationic polymer may be prepared privately or independently, or any commercially available product may be used for the cationic polymer. The commercially available product is exemplified, for example, by polylysine produced by Chisso Corporation, "PAA (trade name)-01", "PAA (trade name)-03", "PAA (trade name)-08" produced by Nitto Boseki Co., Ltd., and polyethyleneimine produced by Junsei Chemical Co., Ltd.

The blending amount of the cationic polymer with respect to the total amount of the second water-based ink is 0.5% by weight to 4% by weight. By making the blending amount of the cationic polymer be within this range, it is possible to suppress the lowering of the optical density (OD value) in a high humidity environment and to obtain a water-based ink excellent in the jetting stability. The blending amount of the cationic polymer is preferably 0.5% by weight to 3% by weight. In a case that the blending amount of the cationic polymer is 0.5% by weight to 3% by weight, in particular, the discharge stability of the second water-based ink is excellent.

The weight average molecular weight of the cationic polymer is, for example, not less than 1200. By using the cationic polymer of which weight average molecular weight is not less than 1200, it is possible to obtain, for example, high filling effect exerted by the interaction between the cationic polymer and an ink-receiving layer of a glossy paper. The weight average molecular weight of the cationic polymer is more preferably 1200 to 8000, and is further more preferably 1200 to 5000.

One cationic polymer may be used singly, or two or more cationic polymers may be used in combination.

The second water-based ink may further contain the same or equivalent additive as that of the first water-based ink, if necessary.

The second water-based ink can be prepared, for example, such that the colorant, water, the water-soluble organic solvent, the cationic polymer, and optionally other additive component(s) as necessary are mixed uniformly in accordance with any conventionally known method, and undissolved matters are removed by a filter or the like.

The water-based ink set of this embodiment may be constructed by only the first water-based ink and the second water-based ink. Alternatively, the water-based ink set of this embodiment may include another water-based ink. The another water-based ink can be prepared, for example, in the same manner as the second water-based ink except that it is unnecessary to contain the cationic polymer in the another water-based ink.

<Second Embodiment>

This embodiment is in such a mode that both of the dye represented by the general formula (1) and the cationic polymer are blended in a same water-based ink, i.e., such a mode that Condition (II) described above is fulfilled. The water-based ink set of this embodiment can be prepared in the same manner as the water-based ink set of the first embodiment except that the first water-based ink is allowed to further contain the cationic polymer and that it is unnecessary for the second water-based ink to contain the cationic polymer.

Since the water-based ink set of each of the first and second embodiments as described above includes at least one water-based ink containing the dye represented by the general formula (1), the water-based ink set has a satisfactory hue and is excellent in the durability or stoutness against light, heat, and ozone. Further, in the water-based ink sets of the first and the second embodiment, at least one water-based ink contains the cationic polymer; and the blending amount of the cationic polymer in the at least one water-based ink is the above-described predetermined blending amount. Accordingly, the water-based ink set of each of the first and second embodiments is capable of satisfactorily suppressing any color change of the secondary color on a recording medium in a high humidity environment and of realizing the jetting stability, at the same time in a suitable manner.

[Ink Cartridge]

In the present teaching, the water-based ink set for ink jet recording can be also provided as an ink cartridge. For example, the ink cartridge of the present teaching has a first water-based ink accommodating section and a second water-based ink accommodating section. The first water-based ink of the present teaching is accommodated in the first water-based ink accommodating section, and the second water-based ink of the present teaching is accommodated in the second water-based ink accommodating section. The ink cartridge of the present teaching may have an accommodating section for any water-based ink other than the first water-based ink and the second water-based ink of the present teaching.

The ink cartridge of the present teaching may be an ink cartridge assembly wherein the first water-based ink cartridge and the second water-based ink cartridge, which are formed individually and independently from each other, are assembled. Alternatively, the ink cartridge of the present teaching may be an integrated type ink cartridge wherein the interior thereof is comparted so that the first water-based ink accommodating section and the second water-based ink accommodating section are formed. For example, any conventionally known main body (body) of an ink cartridge can be used for the main body of the ink cartridge of the present teaching.

[Ink-jet Recording Apparatus]

Next, an explanation will be made about an ink-jet recording apparatus of the present teaching. The recording includes, for example, printing of letters (text), printing of images, printing, etc.

The ink jet recording apparatus of the present teaching is an ink-jet recording apparatus including an ink accommodating section and an ink discharging mechanism which discharges an ink accommodated in the ink accommodating section, wherein the two or more types (kinds) of water-based inks, which constitute the water-based ink set of the present teaching, are accommodated in the ink accommodating section.

FIG. 1 shows an exemplary construction of an ink-jet recording apparatus of the present teaching. As shown in FIG. 1, an ink-jet recording apparatus 1 includes, as main constitutive elements, four ink cartridges 2, an ink discharging mechanism (ink-jet head) 3, a head unit 4, a carriage 5, a driving unit 6, a platen roller 7, and a purge unit 8.

Each of the four ink cartridges 2 includes one of the four color water-based inks of yellow, magenta, cyan, and black one by one. For example, the water-based magenta ink is the first water-based ink of the present teaching, and one of the other water-based inks is the second water-based ink of the present teaching. General water-based inks may be used for the water-based inks other than the above. The ink-jet head 3, which is installed on the head unit 4, performs recording on a recording medium P (for example, recording paper (preferably glossy paper, more preferably glossy paper having a void type ink receiving layer)). The four ink cartridges 2 and the head unit 4 are carried on the carriage 5. The driving unit 6 reciprocatively moves the carriage 5 in a linear direction. For example, a conventionally known driving unit can be used as the driving unit 6 (see, for example, Japanese Patent Application Laid-open No. 2008-246821 corresponding to United States Patent Application Publication No. US 2008/0241398). The platen roller 7 extends in the reciprocating direction of the carriage 5, and the platen roller 7 is arranged to face or to be opposite to the ink-jet head 3.

The purge unit 8 sucks any defective ink containing bubble (air bubble) or the like remaining at the inside of the ink-jet head 3. For example, a conventionally known purge unit can be used as the purge unit 8 (see, for example, Japanese Patent Application Laid-open No. 2008-246821 corresponding to United States Patent Application Publication No. US 2008/0241398).

A wiper member 20 is arranged adjacently to the purge unit 8 at a portion of the purge unit 8 on a side of the platen roller 7. The wiper member 20 is formed to have a spatula-shaped form. The wiper member 20 wipes a nozzle-formed surface of the ink-jet head 3 in accordance with the movement of the carriage 5. With reference to FIG. 1, the cap 18 covers a plurality of nozzles of the ink-jet head 3, which is returned to the reset position when the recording is completed, in order to prevent the water-based inks from being dried.

In the ink-jet recording apparatus 1 of this embodiment, the four ink cartridges 2 are carried on one carriage 5 together with the head unit 4. However, the present teaching is not limited to this. In the ink-jet recording apparatus described above, the respective four ink cartridges 2 may be carried on any carriage distinctly from the head unit 4. Alternatively, the respective four ink cartridges 2 may be arranged and fixed in the ink-jet recording apparatus without being carried on the carriage 5. In the modes as described above, for example, the respective four ink cartridges 2 are connected to the head unit 4 carried on the carriage 5 by tubes or the like, and each of the water-based inks is supplied from one of the respective four ink cartridges 2 to the head unit 4.

The apparatus shown in FIG. 1 adopts the serial type ink-jet head. However, the present teaching is not limited to this. The ink jet recording apparatus may be an apparatus which adopts a line type ink-jet head.

[Ink-jet Recording Method]

According to the present teaching, there is provided an ink-jet recording method for performing recording by discharging an ink from an ink discharging mechanism, the method including using, as the ink, a water-based ink constructing the water-based ink set for ink-jet recording of the present teaching. The ink-jet recording method can be practiced by, for example, using the ink-jet recording apparatus of the present teaching.

The ink-jet recording, which uses the ink-jet recording apparatus 1, is carried out, for example, as follows. At first, the second water-based ink of the present teaching is discharged onto the recording paper P from the ink-jet head 3.

Subsequently, the first water-based ink is discharged to a portion (discharge portion) on the recording paper P onto which the second water-based ink has been discharged. The time, which ranges from the discharge of the second water-based ink to the discharge of the first water-based ink, is not specifically limited. For example, it is allowable that the discharge of the first water-based ink is carried out within a same scanning as that for the discharge of the second water-based ink. By using the water-based ink set of the present teaching, it is possible to realize a stable jetting or discharge from the ink jet head 3. Further, by bringing the second water-based ink and the first water-based ink into contact with each other on the recording paper P, it is possible to obtain a recorded matter which has a satisfactory hue, which is excellent in the durability or stoutness against light, heat, an ozone, and which is suppressed from the color change of the secondary color on the recording medium in a high humidity environment. The recording paper P after the recording is discharged from the ink-jet recording apparatus 1.

As in this embodiment, it is preferable that the first water-based ink, which contains the dye represented by the general formula (1), is discharged after discharging the second water-based ink containing the cationic polymer. However, the present teaching is not limited to this. In the present teaching, the second water-based ink may be discharged after previously discharging the first water-based ink onto the recording paper P. Alternatively, the discharge of the second water-based ink and the discharge of the first water-based ink onto the recording paper P may be performed simultaneously.

EXAMPLES

Next, Examples of the present teaching will be explained together with Comparative Examples. It is noted that the present teaching is not limited and restricted to Examples and Comparative Examples described below.

[Preparation of Water-based Yellow Ink]

Respective components of a water-based yellow ink composition (Table 2) were mixed uniformly. After that, an obtained mixture was filtrated by using a hydrophilic polytetrafluoroethylene (PTFE) type membrane filter (pore size: 0.20 μm) produced by Toyo Roshi Kaisha, Ltd. Accordingly, water-based yellow inks for ink-jet recording Y1 to Y21 were obtained. In Table 2, dyes (Ya) to (Ye) are compounds which are represented by following chemical formulas (Ya) to (Ye) respectively. In the chemical formulas (Ya) to (Ye), —$C_4H_9(t)$ represents tert-butyl group.

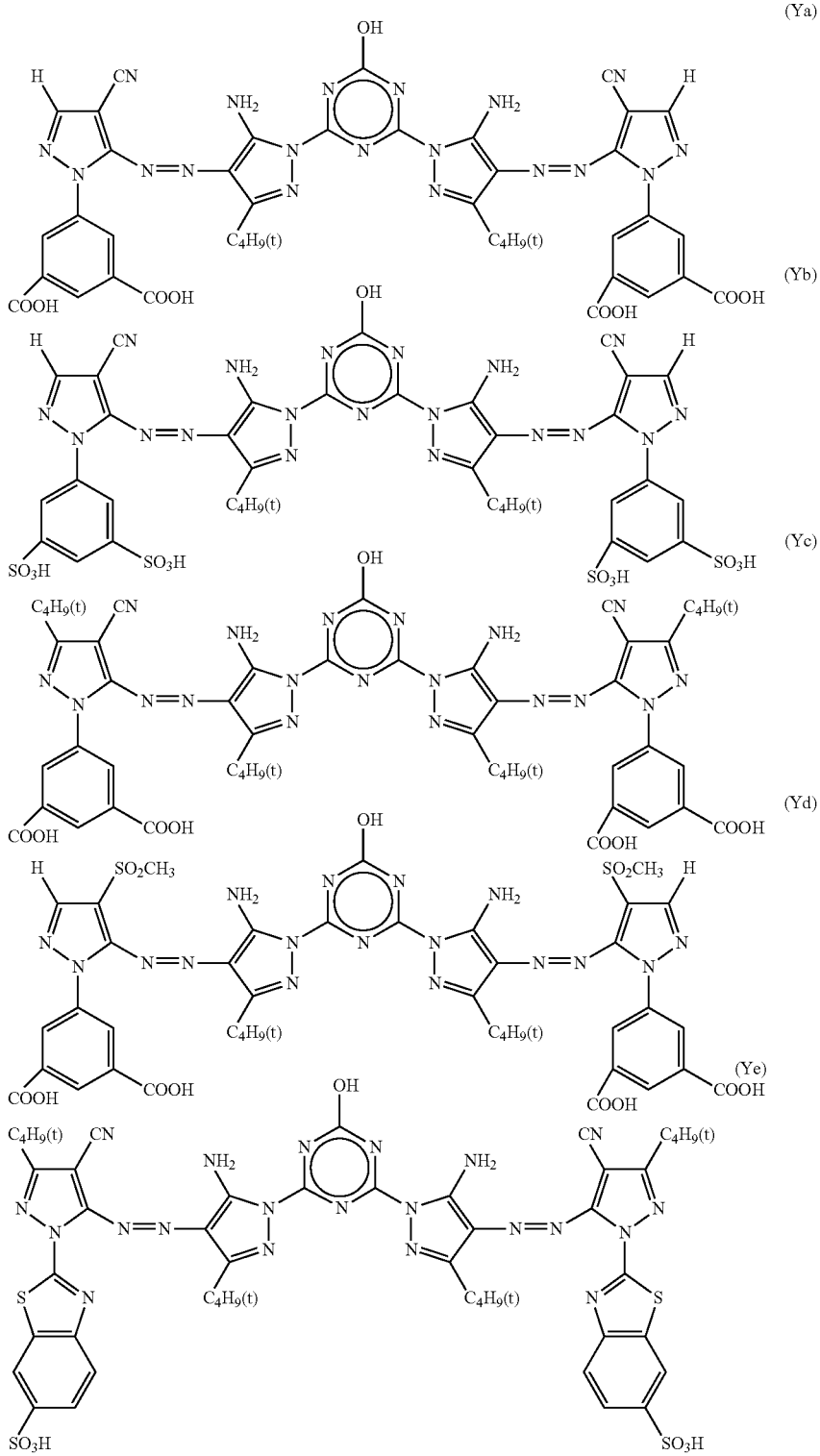

[Preparation of Water-based Magenta Ink]

Respective components of a water-based magenta ink composition (Table 3) were mixed uniformly. After that, an obtained mixture was filtrated by using a hydrophilic polytetrafluoroethylene (PTFE) type membrane filter (pore size: 0.20 μm) produced by Toyo Roshi Kaisha, Ltd. Accordingly, water-based magenta inks for ink-jet recording M1 to M27 were obtained. In Table 3, dyes (1-A) to (1-E) are compounds which are represented by dyes (1-A) to (1-E) shown in Table 1, respectively.

[Preparation of Water-based Cyan Ink]

Respective components of a water-based cyan ink composition (Table 4) were mixed uniformly. After that, an obtained mixture was filtrated by using a hydrophilic polytetrafluoroethylene (PTFE) type membrane filter (pore size: 0.20 μm) produced by Toyo Roshi Kaisha, Ltd. Accordingly, water-based cyan inks for ink-jet recording C1 to C21 were obtained. In Table 4, dyes (Ca) to (Ce) are compounds which are represented by following chemical formulas (Ca) to (Ce) respectively. In the chemical formulas (Ca) to (Ce), Pc(Cu) is the copper phthalocyanine nucleus represented by following general formula (Pc); and $R_{21}$, $R_{22}$, $R_{23}$ and $R_{24}$ respectively exist in the four benzene rings A, B, C, and D in the copper phthalocyanine nucleus represented by the general formula (Pc).

The dyes (Ca) to (Ce) can be produced, for example, by the method disclosed in United States Patent Application Publication No. US 2012/0081453 of which content or disclosure is incorporated herein by reference in its entity as constructing a part of the present specification.

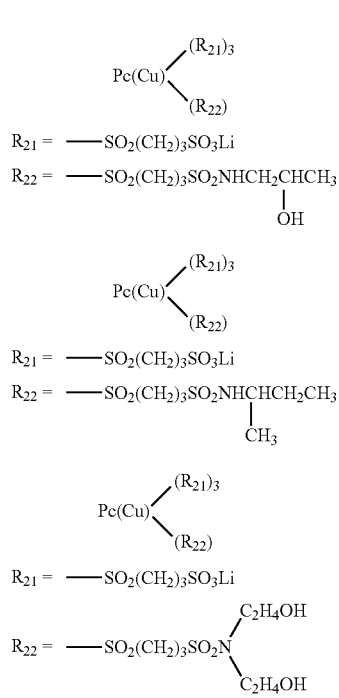

(Ca)

$R_{21} = $ —$SO_2(CH_2)_3SO_3Li$ $R_{22} = $ —$SO_2(CH_2)_3SO_2NHCH_2CHCH_3$
                                                   |
                                                   OH (Cb)

$R_{21} = $ —$SO_2(CH_2)_3SO_3Li$ $R_{22} = $ —$SO_2(CH_2)_3SO_2NHCHCH_2CH_3$
                                                   |
                                                   $CH_3$ (Cc)

$R_{21} = $ —$SO_2(CH_2)_3SO_3Li$ $R_{22} = $ —$SO_2(CH_2)_3SO_2N\begin{matrix}C_2H_4OH\\C_2H_4OH\end{matrix}$

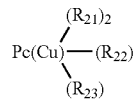

(Cd)

$R_{21} = $ —$SO_2(CH_2)_3SO_3Li$ $R_{22} = $ —$SO_2(CH_2)_3SO_2NHCH_2CHCH_3$
                                                   |
                                                   OH $R_{23} = $ —$SO_2(CH_2)_3SO_2NHCHCH_2OH$
                                                   |
                                                   $CH_3$

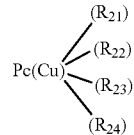

(Ce)

$R_{21} = $ —$SO_2(CH_2)_3SO_3Li$ $R_{22} = $ —$SO_2(CH_2)_3CO_2Li$ $R_{23} = $ —$SO_2(CH_2)_3SO_2NHCH_2CHCH_3$
                                                   |
                                                   OH $R_{24} = $ —$SO_2(CH_2)_3SO_2NHCHCH_2OH$
                                                   |
                                                   $CH_3$

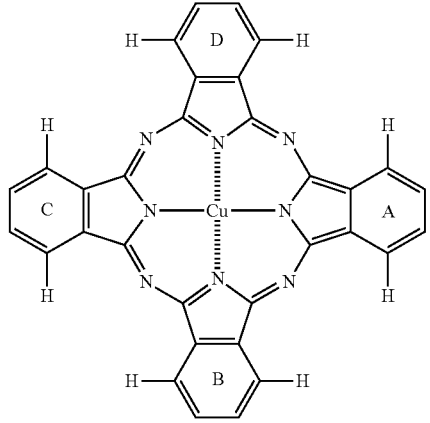

(Po)

TABLE 2

|  |  | Y1 | Y2 | Y3 | Y4 | Y5 | Y6 | Y7 |
|---|---|---|---|---|---|---|---|---|
| Water-based Yellow Ink Composition (% by weight) | Dye (Ya) | 2.7 | — | — | — | — | 2.7 | — |
|  | Dye (Yb) | — | 2.7 | — | — | — | — | 2.7 |
|  | Dye (Yc) | — | — | 2.7 | — | — | — | — |
|  | Dye (Yd) | — | — | — | 2.7 | — | — | — |
|  | Dye (Ye) | — | — | — | — | 2.7 | — | — |
|  | Glycerol (*1) | 23.5 | 22.0 | 22.5 | 23.0 | 25.5 | 23.5 | 22.0 |
|  | Diethylene glycol | 3.0 | 3.0 | 3.0 | 3.0 | 3.0 | 3.0 | 3.0 |
|  | Dipropylene glycol monopropyl ether | 2.0 | 2.0 | 2.0 | 2.0 | 2.0 | 2.0 | 2.0 |
|  | Olfine (trade name) E1010 (*2) | 0.2 | 0.2 | 0.2 | 0.2 | 0.2 | 0.2 | 0.2 |
|  | Polylysine (*3) | 2.5 | 4.0 | 3.5 | 3.0 | 0.5 | — | — |
|  | PAA (trade name) −3 (*4) | — | — | — | — | — | 2.5 | — |
|  | PAA (trade name) −8 (*5) | — | — | — | — | — | — | 4.0 |
|  | Polyethyleneimine 1800 (*6) | — | — | — | — | — | — | — |
|  | Polyethyleneimine 1200 (*7) | — | — | — | — | — | — | — |
|  | Kollidon 12PF (*8) | — | — | — | — | — | — | — |
|  | Lysine hydrochloride (*9) | — | — | — | — | — | — | — |

TABLE 2-continued

|  |  |  |  |  |  |  |  |
|---|---|---|---|---|---|---|---|
| Dimethyl ethyloctyl ammonium ethylsulfate | — | — | — | — | — | — | — |
| Water | balance | balance | balance | balance | balance | balance | balance |
| Weight average molecular weight of cationic polymer | 4000 | 4000 | 4000 | 4000 | 4000 | 3000 | 8000 |

|  |  | Y8 | Y9 | Y10 | Y11 | Y12 | Y13 | Y14 |
|---|---|---|---|---|---|---|---|---|
| Water-based Yellow Ink Composition (% by weight) | Dye (Ya) | — | — | — | 2.7 | — | — | — |
|  | Dye (Yb) | — | — | — | — | 2.7 | — | — |
|  | Dye (Yc) | 2.7 | — | — | — | — | 2.7 | — |
|  | Dye (Yd) | — | 2.7 | — | — | — | — | 2.7 |
|  | Dye (Ye) | — | — | 2.7 | — | — | — | — |
|  | Glycerol (*1) | 25.5 | 23.5 | 22.0 | 25.5 | 26.0 | 23.5 | 23.5 |
|  | Diethylene glycol | 3.0 | 3.0 | 3.0 | 3.0 | 3.0 | 3.0 | 3.0 |
|  | Dipropylene glycol monopropyl ether | 2.0 | 2.0 | 2.0 | 2.0 | 2.0 | 2.0 | 2.0 |
|  | Olfine (trade name) E1010 (*2) | 0.2 | 0.2 | 0.2 | 0.2 | 0.2 | 0.2 | 0.2 |
|  | Polylysine (*3) | — | — | — | — | — | — | — |
|  | PAA (trade name) -3 (*4) | 0.5 | — | — | — | — | — | — |
|  | PAA (trade name) -8 (*5) | — | — | — | — | — | — | — |
|  | Polyethyleneimine 1800 (*6) | — | — | 4.0 | — | — | — | — |
|  | Polyethyleneimine 1200 (*7) | — | 2.5 | — | 0.5 | — | — | — |
|  | Kollidon 12PF (*8) | — | — | — | — | — | 2.5 | — |
|  | Lysine hydrochloride (*9) | — | — | — | — | — | — | 2.5 |
|  | Dimethyl ethyloctyl ammonium ethylsulfate | — | — | — | — | — | — | — |
|  | Water | balance | balance | balance | balance | balance | balance | balance |
|  | Weight average molecular weight of cationic polymer | 3000 | 1200 | 1800 | 1200 | — | 3000 | 146 |

|  |  | Y15 | Y16 | Y17 | Y18 | Y19 | Y20 | Y21 |
|---|---|---|---|---|---|---|---|---|
| Water-based Yellow Ink Composition (% by weight) | Dye (Ya) | — | 2.7 | — | — | — | — | 2.7 |
|  | Dye (Yb) | — | — | 2.7 | — | — | — | — |
|  | Dye (Yc) | — | — | — | — | — | — | — |
|  | Dye (Yd) | — | — | — | 2.7 | — | — | — |
|  | Dye (Ye) | 2.7 | — | — | — | 2.7 | 2.7 | — |
|  | Glycerol (*1) | 23.5 | 21.5 | 25.7 | 21.5 | 25.7 | 21.5 | 25.7 |
|  | Diethylene glycol | 3.0 | 3.0 | 3.0 | 3.0 | 3.0 | 3.0 | 3.0 |
|  | Dipropylene glycol monopropyl ether | 2.0 | 2.0 | 2.0 | 2.0 | 2.0 | 2.0 | 2.0 |
|  | Olfine (trade name) E1010 (*2) | 0.2 | 0.2 | 0.2 | 0.2 | 0.2 | 0.2 | 0.2 |
|  | Polylysine (*3) | — | 4.5 | 0.3 | — | — | — | — |
|  | PAA (trade name) -3 (*4) | — | — | — | — | 0.3 | — | — |
|  | PAA (trade name) -8 (*5) | — | — | — | 4.5 | — | — | — |
|  | Polyethyleneimine 1800 (*6) | — | — | — | — | — | 4.5 | — |
|  | Polyethyleneimine 1200 (*7) | — | — | — | — | — | — | 0.3 |
|  | Kollidon 12PF (*8) | — | — | — | — | — | — | — |
|  | Lysine hydrochloride (*9) | — | — | — | — | — | — | — |
|  | Dimethyl ethyloctyl ammonium ethylsulfate | 2.5 | — | — | — | — | — | — |
|  | Water | balance | balance | balance | balance | balance | balance | balance |
|  | Weight average molecular weight of cationic polymer | 186 | 4000 | 4000 | 8000 | 3000 | 1800 | 1200 |

*1: Produced by Kao Corporation, numerical values in the table indicate active ingredient amounts.
*2: Ethylene oxide (10 mole) adduct of acetylene diol, produced by Nissin Chemical Industry Co., Ltd.
*3: Produced by Chisso Corporation (weight average molecular weight: 4000), numerical values in the table indicate active ingredient amounts.
*4: Unneutralized product of polyallylamine (weight average molecular weight: 3000), produced by Nitto Boseki Co., Ltd., active ingredient amount = 20% by weight, numerical values in the table indicate active ingredient amounts.
*5: Unneutralized product of polyallylamine (weight average molecular weight: 8000), produced by Nitto Boseki Co., Ltd., active ingredient amount = 20% by weight, numerical values in the table indicate active ingredient amounts.
*6: Produced by Junsei Chemical Co., Ltd. (weight average molecular weight: 1800).
*7: Produced by Junsei Chemical Co., Ltd. (weight average molecular weight: 1200).
*8: Polyvinyl pyrrolidone produced by BASF (weight average molecular weight: 3000).
*9: Produced by Kyowa Hakko Bio Co., Ltd. (weight average molecular weight: 146).

TABLE 3

|  |  | M1 | M2 | M3 | M4 | M5 | M6 | M7 |
|---|---|---|---|---|---|---|---|---|
| Water-based Magenta Ink Composition (% by weight) | Dye (1-A) | 3.5 | — | — | — | — | 3.5 | — |
|  | Dye (1-B) | — | 3.5 | — | — | — | — | 3.5 |
|  | Dye (1-C) | — | — | 3.5 | — | — | — | — |
|  | Dye (1-D) | — | — | — | 3.5 | — | — | — |
|  | Dye (1-E) | — | — | — | — | 3.5 | — | — |
|  | Glycerol (*1) | 23.5 | 22.0 | 22.5 | 23.0 | 25.5 | 23.5 | 23.5 |
|  | Diethylene glycol | 3.0 | 3.0 | 3.0 | 3.0 | 3.0 | 3.0 | 3.0 |
|  | Dipropylene glycol monopropyl ether | 2.0 | 2.0 | 2.0 | 2.0 | 2.0 | 2.0 | 2.0 |
|  | Olfine (trade name) E1010 (*2) | 0.2 | 0.2 | 0.2 | 0.2 | 0.2 | 0.2 | 0.2 |

TABLE 3-continued

|  |  |  |  |  |  |  |  |
|---|---|---|---|---|---|---|---|
| Polylysine (*3) | 2.5 | 4.0 | 3.5 | 3.0 | 0.5 | — | — |
| PAA (trade name) −3 (*4) | — | — | — | — | — | — | 2.5 |
| PAA (trade name) −8 (*5) | — | — | — | — | — | 2.5 | — |
| Polyethyleneimine 1800 (*6) | — | — | — | — | — | — | — |
| Polyethyleneimine 1200 (*7) | — | — | — | — | — | — | — |
| Kollidon 12PF (*8) | — | — | — | — | — | — | — |
| Lysine hydrochloride (*9) | — | — | — | — | — | — | — |
| Dimethyl ethyloctyl ammonium ethylsulfate | — | — | — | — | — | — | — |
| Water | balance | balance | balance | balance | balance | balance | balance |
| Weight average molecular weight of cationic polymer | 4000 | 4000 | 4000 | 4000 | 4000 | 8000 | 3000 |

|  | M8 | M9 | M10 | M11 | M12 | M13 | M14 |
|---|---|---|---|---|---|---|---|
| Dye (1-A) | — | — | — | 3.5 | — | — | — |
| Dye (1-B) | — | — | — | — | 3.5 | — | — |
| Dye (1-C) | 3.5 | — | — | — | — | 3.5 | — |
| Dye (1-D) | — | 3.5 | — | — | — | — | 3.5 |
| Dye (1-E) | — | — | 3.5 | — | — | — | — |
| Glycerol (*1) | 22.0 | 22.5 | 23.0 | 25.5 | 23.5 | 23.5 | 22.0 |
| Diethylene glycol | 3.0 | 3.0 | 3.0 | 3.0 | 3.0 | 3.0 | 3.0 |
| Dipropylene glycol monopropyl ether | 2.0 | 2.0 | 2.0 | 2.0 | 2.0 | 2.0 | 2.0 |
| Olfine (trade name) E1010 (*2) | 0.2 | 0.2 | 0.2 | 0.2 | 0.2 | 0.2 | 0.2 |
| Polylysine (*3) | — | — | — | — | — | — | — |
| PAA (trade name) −3 (*4) | — | — | — | 0.5 | — | — | — |
| PAA (trade name) −8 (*5) | 4.0 | 3.5 | 3.0 | — | — | — | — |
| Polyethyleneimine 1800 (*6) | — | — | — | — | 2.5 | — | 4.0 |
| Polyethyleneimine 1200 (*7) | — | — | — | — | — | 2.5 | — |
| Kollidon 12PF (*8) | — | — | — | — | — | — | — |
| Lysine hydrochloride (*9) | — | — | — | — | — | — | — |
| Dimethyl ethyloctyl ammonium ethylsulfate | — | — | — | — | — | — | — |
| Water | balance | balance | balance | balance | balance | balance | balance |
| Weight average molecular weight of cationic polymer | 8000 | 8000 | 8000 | 3000 | 1800 | 1200 | 1800 |

|  |  | M15 | M16 | M17 | M18 | M19 | M20 | M21 |
|---|---|---|---|---|---|---|---|---|
| Water-based Magenta Ink Composition (% by weight) | Dye (1-A) | — | 3.5 | — | — | — | — | 3.5 |
| | Dye (1-B) | — | — | 3.5 | — | — | — | — |
| | Dye (1-C) | — | — | — | 3.5 | — | — | — |
| | Dye (1-D) | — | — | — | — | 3.5 | — | — |
| | Dye (1-E) | 3.5 | — | — | — | — | 3.5 | — |
| | Glycerol (*1) | 22.5 | 23.0 | 25.5 | 26.0 | 23.5 | 23.5 | 23.5 |
| | Diethylene glycol | 3.0 | 3.0 | 3.0 | 3.0 | 3.0 | 3.0 | 3.0 |
| | Dipropylene glycol monopropyl ether | 2.0 | 2.0 | 2.0 | 2.0 | 2.0 | 2.0 | 2.0 |
| | Olfine (trade name) E1010 (*2) | 0.2 | 0.2 | 0.2 | 0.2 | 0.2 | 0.2 | 0.2 |
| | Polylysine (*3) | — | — | — | — | — | — | — |
| | PAA (trade name) −3 (*4) | — | — | — | — | — | — | — |
| | PAA (trade name) −8 (*5) | — | — | — | — | — | — | — |
| | Polyethyleneimine 1800 (*6) | 3.5 | 3.0 | — | — | — | — | — |
| | Polyethyleneimine 1200 (*7) | — | — | 0.5 | — | — | — | — |
| | Kollidon 12PF (*8) | — | — | — | — | 2.5 | — | — |
| | Lysine hydrochloride (*9) | — | — | — | — | — | 2.5 | — |
| | Dimethyl ethyloctyl ammonium ethylsulfate | — | — | — | — | — | — | 2.5 |
| | Water | balance | balance | balance | balance | balance | balance | balance |
| | Weight average molecular weight of cationic polymer | 1800 | 1800 | 1200 | — | 3000 | 146 | 186 |

|  |  | M22 | M23 | M24 | M25 | M26 | M27 |
|---|---|---|---|---|---|---|---|
| Water-based Magenta Ink Composition (% by weight) | Dye (1-A) | — | — | — | — | 3.5 | — |
| | Dye (1-B) | 3.5 | — | — | — | — | 3.5 |
| | Dye (1-C) | — | 3.5 | — | — | — | — |
| | Dye (1-D) | — | — | 3.5 | — | — | — |
| | Dye (1-E) | — | — | — | 3.5 | — | — |
| | Glycerol (*1) | 21.5 | 25.7 | 21.5 | 25.7 | 21.5 | 25.7 |
| | Diethylene glycol | 3.0 | 3.0 | 3.0 | 3.0 | 3.0 | 3.0 |
| | Dipropylene glycol monopropyl ether | 2.0 | 2.0 | 2.0 | 2.0 | 2.0 | 2.0 |
| | Olfine (trade name) E1010 (*2) | 0.2 | 0.2 | 0.2 | 0.2 | 0.2 | 0.2 |
| | Polylysine (*3) | 4.5 | 0.3 | — | — | — | — |
| | PAA (trade name) −3 (*4) | — | — | — | 0.3 | — | — |
| | PAA (trade name) −8 (*5) | — | — | 4.5 | — | — | — |
| | Polyethyleneimine 1800 (*6) | — | — | — | — | 4.5 | — |
| | Polyethyleneimine 1200 (*7) | — | — | — | — | — | 0.3 |
| | Kollidon 12PF (*8) | — | — | — | — | — | — |

TABLE 3-continued

|  | | | | | | |
|---|---|---|---|---|---|---|
| Lysine hydrochloride (*9) | — | — | — | — | — | — |
| Dimethyl ethyloctyl ammonium ethylsulfate | — | — | — | — | — | — |
| Water | balance | balance | balance | balance | balance | balance |
| Weight average molecular weight of cationic polymer | 4000 | 4000 | 8000 | 3000 | 1800 | 1200 |

*1: Produced by Kao Corporation, numerical values in the table indicate active ingredient amounts.
*2: Ethylene oxide (10 mole) adduct of acetylene diol, produced by Nissin Chemical Industry Co , Ltd.
*3: Produced by Chisso Corporation (weight average molecular weight: 4000), numerical values in the table indicate active ingredient amounts.
*4: Unneutralized product of polyallylamine (weight average molecular weight: 3000), produced by Nitto Boseki Co., Ltd., active ingredient amount = 20% by weight, numerical values in the table indicate active ingredient amounts.
*5: Unneutralized product of polyallylamine (weight average molecular weight: 8000), produced by Nitto Boseki Co., Ltd., active ingredient amount = 20% by weight, numerical values in the table indicate active ingredient amounts.
*6: Produced by Junsei Chemical Co., Ltd. (weight average molecular weight: 1800).
*7: Produced by Junsei Chemical Co., Ltd. (weight average molecular weight: 1200).
*8: Polyvinyl pyrrolidone produced by BASF (weight average molecular weight: 3000).
*9: Produced by Kyowa Hakko Bio Co., Ltd. (weight average molecular weight: 146).

TABLE 4

| | | C1 | C2 | C3 | C4 | C5 | C6 | C7 |
|---|---|---|---|---|---|---|---|---|
| Water-based Cyan Ink Composition (% by weight) | Dye (Ca) | 3.5 | — | — | — | — | 3.5 | — |
| | Dye (Cb) | — | 3.5 | — | — | — | — | 3.5 |
| | Dye (Cc) | — | — | 3.5 | — | — | — | — |
| | Dye (Cd) | — | — | — | 3.5 | — | — | — |
| | Dye (Ce) | — | — | — | — | 3.5 | — | — |
| | Glycerol (*1) | 23.5 | 22.0 | 22.5 | 23.0 | 25.5 | 23.5 | 22.0 |
| | Diethylene glycol | 3.0 | 3.0 | 3.0 | 3.0 | 3.0 | 3.0 | 3.0 |
| | Dipropylene glycol monopropyl ether | 2.0 | 2.0 | 2.0 | 2.0 | 2.0 | 2.0 | 2.0 |
| | Olfine (trade name) E1010 (*2) | 0.2 | 0.2 | 0.2 | 0.2 | 0.2 | 0.2 | 0.2 |
| | Polylysine (*3) | 2.5 | 4.0 | 3.5 | 3.0 | 0.5 | — | — |
| | PAA (trade name) -3 (*4) | — | — | — | — | — | 2.5 | — |
| | PAA (trade name) -8 (*5) | — | — | — | — | — | — | 4.0 |
| | Polyethyleneimine 1800 (*6) | — | — | — | — | — | — | — |
| | Polyethyleneimine 1200 (*7) | — | — | — | — | — | — | — |
| | Kollidon 12PF (*8) | — | — | — | — | — | — | — |
| | Lysine hydrochloride (*9) | — | — | — | — | — | — | — |
| | Dimethyl ethyloctyl ammonium ethylsulfate | — | — | — | — | — | — | — |
| | Water | balance | balance | balance | balance | balance | balance | balance |
| | Weight average molecular weight of cationic polymer | 4000 | 4000 | 4000 | 4000 | 4000 | 3000 | 8000 |

| | | C8 | C9 | C10 | C11 | C12 | C13 | C14 |
|---|---|---|---|---|---|---|---|---|
| Water-based Cyan Ink Composition (% by weight) | Dye (Ca) | — | — | — | 3.5 | — | — | — |
| | Dye (Cb) | — | — | — | — | 3.5 | — | — |
| | Dye (Cc) | 3.5 | — | — | — | — | 3.5 | — |
| | Dye (Cd) | — | 3.5 | — | — | — | — | 3.5 |
| | Dye (Ce) | — | — | 3.5 | — | — | — | — |
| | Glycerol (*1) | 25.5 | 23.5 | 22.0 | 25.5 | 26.0 | 23.5 | 23.5 |
| | Diethylene glycol | 3.0 | 3.0 | 3.0 | 3.0 | 3.0 | 3.0 | 3.0 |
| | Dipropylene glycol monopropyl ether | 2.0 | 2.0 | 2.0 | 2.0 | 2.0 | 2.0 | 2.0 |
| | Olfine (trade name) E1010 (*2) | 0.2 | 0.2 | 0.2 | 0.2 | 0.2 | 0.2 | 0.2 |
| | Polylysine (*3) | — | — | — | — | — | — | — |
| | PAA (trade name) -3 (*4) | 0.5 | — | — | — | — | — | — |
| | PAA (trade name) -8 (*5) | — | — | — | — | — | — | — |
| | Polyethyleneimine 1800 (*6) | — | — | 4.0 | — | — | — | — |
| | Polyethyleneimine 1200 (*7) | — | 2.5 | — | 0.5 | — | — | — |
| | Kollidon 12PF (*8) | — | — | — | — | — | 2.5 | — |
| | Lysine hydrochloride (*9) | — | — | — | — | — | — | 2.5 |
| | Dimethyl ethyloctyl ammonium ethylsulfate | — | — | — | — | — | — | — |
| | Water | balance | balance | balance | balance | balance | balance | balance |
| | Weight average molecular weight of cationic polymer | 3000 | 1200 | 1800 | 1200 | — | 3000 | 146 |

| | | C15 | C16 | C17 | C18 | C19 | C20 | C21 |
|---|---|---|---|---|---|---|---|---|
| Water-based Cyan Ink Composition (% by weight) | Dye (Ca) | — | 3.5 | — | — | — | — | 3.5 |
| | Dye (Cb) | — | — | 3.5 | — | — | — | — |
| | Dye (Cc) | — | — | — | 3.5 | — | — | — |
| | Dye (Cd) | — | — | — | — | 3.5 | — | — |
| | Dye (Ce) | 3.5 | — | — | — | — | 3.5 | — |
| | Glycerol (*1) | 23.5 | 21.5 | 25.7 | 21.5 | 25.7 | 21.5 | 25.7 |
| | Diethylene glycol | 3.0 | 3.0 | 3.0 | 3.0 | 3.0 | 3.0 | 3.0 |
| | Dipropylene glycol monopropyl ether | 2.0 | 2.0 | 2.0 | 2.0 | 2.0 | 2.0 | 2.0 |

TABLE 4-continued

| Olfine (trade name) E1010 (*2) | 0.2 | 0.2 | 0.2 | 0.2 | 0.2 | 0.2 | 0.2 |
|---|---|---|---|---|---|---|---|
| Polylysine (*3) | — | 4.5 | 0.3 | — | — | — | — |
| PAA (trade name) −3 (*4) | — | — | — | — | 0.3 | — | — |
| PAA (trade name) −8 (*5) | — | — | — | 4.5 | — | — | — |
| Polyethyleneimine 1800 (*6) | — | — | — | — | — | 4.5 | — |
| Polyethyleneimine 1200 (*7) | — | — | — | — | — | — | 0.3 |
| Kollidon 12PF (*8) | — | — | — | — | — | — | — |
| Lysine hydrochloride (*9) | — | — | — | — | — | — | — |
| Dimethyl ethyloctyl ammonium ethylsulfate | 2.5 | — | — | — | — | — | — |
| Water | balance | balance | balance | balance | balance | balance | balance |
| Weight average molecular weight of cationic polymer | 186 | 4000 | 4000 | 8000 | 3000 | 1800 | 1200 |

*1: Produced by Kao Corporation, numerical values in the table indicate active ingredient amounts.
*2: Ethylene oxide (10 mole) adduct of acetylene diol, produced by Nissin Chemical Industry Co., Ltd.
*3: Produced by Chisso Corporation (weight average molecular weight: 4000), numerical values in the table indicate active ingredient amounts.
*4: Unneutralized product of polyallylamine (weight average molecular weight: 3000), produced by Nitto Boseki Co., Ltd., active ingredient amount = 20% by weight, numerical values in the table indicate active ingredient amounts.
*5: Unneutralized product of polyallylamine (weight average molecular weight: 8000), produced by Nitto Boseki Co., Ltd., active ingredient amount = 20% by weight, numerical values in the table indicate active ingredient amounts.
*6: Produced by Junsei Chemical Co., Ltd. (weight average molecular weight: 1800).
*7: Produced by Junsei Chemical Co., Ltd. (weight average molecular weight: 1200).
*8: Polyvinyl pyrrolidone produced by BASF (weight average molecular weight: 3000).
*9: Produced by Kyowa Hakko Bio Co., Ltd. (weight average molecular weight: 146).

Examples 1 to 40 and Comparative Examples 1 to 28

<Construction of Water-based Ink Set for Ink-jet Recording>

Water-based ink sets for ink-jet recording of Examples 1 to 40 and Comparative Examples 1 to 28 were constructed by combining the water-based yellow ink, the water-based magenta ink, and the water-based cyan ink as shown in Tables 5 to 11.

<Evaluations of Water-based Ink Set for Ink-jet Recording>

With respect to the water-based ink sets of Examples 1-40 and Comparative Examples 1-28, (a) chromaticness (C*) difference (ΔC*) evaluation, (b) discharge stability evaluation and (c) overall evaluation were performed by the following methods.

(a) Chromaticness (C*) Difference (ΔC*) Evaluation

An ink jet printer-equipped digital multifunction machine DCP-385C produced by Brother Industries, Ltd. was used to record a tri-color black patch on "Exclusive paper (photograph glossy paper) (BP-71)" (Glossy paper A) produced by Brother Industries, Ltd. by using the three color water-based inks (water-based yellow ink: water-based magenta ink: water-based cyan ink (volume ratio)=1:1:1) constructing each of the water-based ink sets of Examples 1-40 and Comparative Examples 1-28. The chromaticness (C*) difference (ΔC*) was calculated for the recorded tri-color black patch in accordance with the following method. Note that regarding Examples 1, 13, 23 and 27 and Comparative Examples 2, 12, 20 and 22, tri-color black patches were recorded also on "Photograph paper Crispia <Highly Glossy>" (Glossy paper B) produced by Seiko Epson Corp in Examples 1 and 23 and Comparative Examples 2 and 22; tri-color black patches were recorded also on "Photograph paper <Glossy>" (Glossy paper C) produced by Seiko Epson Corp. in Examples 13 and 27 and Comparative Examples 12 and 20; and the chromaticness (C*) difference (ΔC*) was calculated also regarding the recording on each of Glossy papers B and C, in the same manner as described above.

The tri-color black patch was recorded in an environment at the ordinary temperature and the ordinary humidity (temperature: 25° C., relative humidity: 50%), and was stored for 24 hours in the same environment as that provided during the recording to obtain an ordinary temperature-ordinary humidity environment sample. Further, the tri-color black patch was recorded in an environment at a low temperature and a high humidity (temperature: 18° C., relative humidity: 80%), and was stored for 24 hours in the same environment as that provided during the recording to obtain a low temperature-high humidity environment sample. The a* value and the b* value of each of the ordinary temperature-ordinary humidity environment sample and the low temperature-high humidity environment sample were measured by using a spectrophotometer Spectrolino produced by Gretag Macbeth (measuring field: 2°, white reference: Abs (absolute white), light source: $D_{50}$, density reference: ANSI T). The chromaticness (C*) difference (ΔC*) was calculated between the two environments of the ordinary temperature-ordinary humidity and the low temperature-high humidity in accordance with the following expression. The chromaticness (C*) difference (ΔC*) was evaluated in accordance with the following evaluation criteria.

$$\Delta C^* = \{(a^*_1 - a^*_2)^2 + (b^*_1 - b^*_2)^2\}^{1/2}$$

$a^*_1$: a* value of tri-color black patch of low temperature-high humidity environment sample;

$a^*_2$: a* value of tri-color black patch of ordinary temperature-ordinary humidity environment sample;

$b^*_1$: b* value of tri-color black patch of low temperature-high humidity environment sample;

$b^*_2$: b* value of tri-color black patch of ordinary temperature-ordinary humidity environment sample.

<Evaluation Criterion for Chromaticness (C*) Difference (ΔC*) Evaluation>

A: chromaticness (C*) difference (ΔC*) was less than 2.5;

B: chromaticness (C*) difference (ΔC*) was not less than 2.5 and less than 5;

C: chromaticness (C*) difference (ΔC*) was not less than 5.

(b) Evaluation of Jetting Stability

With respect to each of the three color inks constructing the water-base ink set of one of Examples 1-40 and Comparative Examples 1-28, each of the three color inks was used to perform continuous recording of million dots (about 300 sheets of paper) on Regular Paper BP60PA produced by Brother Industries, Ltd. using the ink jet printer-equipped digital multifunction machine DCP-385C. The results of the continuous recording were evaluated in accordance with the following evaluation criterion. Note that the term "un-discharge (non-discharge)" indicates such a state that the nozzles of the ink jethead are clogged and the water-based ink is not discharged from the nozzles; and that the term "discharge-bending (discharge-deflection)" indicates such a state that a part of the nozzles of the ink-jet head are clogged, and the water-based ink is not discharged perpendicularly to the recording paper, but is discharged obliquely with respect to the recording paper.

<Evaluation Criterion for Discharge Stability>

A: Neither un-discharge nor discharge-bending occurred at all during the continuous recording in all of the three color water-based inks constructing the water-based ink set.

B: Un-discharge and discharge-bending hardly occurred during the continuous recording in all of the three color water-based inks constructing the water-based ink set.

C: Un-discharge and discharge-bending occurred at many portions or locations on the recording paper during the continuous recording in any one of the three color water-based inks constructing the water-based ink set.

(c) Overall Evaluation

With respect to the water-based ink sets, the overall evaluation was performed in accordance with the following evaluation criterion based on the results of (a) and (b) described above.

<Evaluation Criterion for Overall Evaluation>

G: There was no "C" evaluation in both of the results of (a) and (b).

NG: There was "C" evaluation in any one of (a) and (b).

The construction and the evaluation results of the water-based ink sets of Examples 1-40 are shown in Tables 5 to 8. The construction and the evaluation results of the water-based ink sets of Comparative Examples 1 to 28 are shown in Tables 9 to 11. Note that in Tables 5-11, the molecular weight shows the weight average molecular weight; and that regarding Comparative Examples 2-4, 11-13 and 20-22 shown in Tables 9-11, the weight average molecular weight of the cationic polymer shows the weight average molecular weight of polyvinylpyrrolidone that is a non-cationic polymer or the weight average molecular weight of lysine hydrochloride or dimethyl ethyloctyl ammonium ethylsulfate that are a cationic low molecular weight substance, each of which was used in place of the cationic polymer.

TABLE 5

| | | | EXAMPLES | | | | |
|---|---|---|---|---|---|---|---|
| | | | EX1 | EX2 | EX3 | EX4 | EX5 |
| Water-based Ink Set | Water-based Yellow Ink | | Y1 | Y6 | Y9 | Y2 | Y3 |
| | Cationic polymer | Type | Polylysine | PAA trade name) −3 | Polyethyleneimine 1200 | Polylysine | Polylysine |
| | | Molecular weight | 4000 | 3000 | 1200 | 4000 | 4000 |
| | | Blending amount | 2.5 | 2.5 | 2.5 | 4.0 | 3.5 |
| | Water-based Cyan Ink | | C12 | C12 | C12 | C12 | C12 |
| | Cationic polymer | Type | — | — | — | — | — |
| | | Molecular weight | — | — | — | — | — |
| | | Blending amount | — | — | — | — | — |
| | Water-based Magenta Ink | | M18 | M18 | M18 | M18 | M18 |
| | Cationic polymer | Type | — | — | — | — | — |
| | | Molecular weight | — | — | — | — | — |
| | | Blending amount | — | — | — | — | — |
| | Glossy paper | | A | B | A | A | A |
| | Chromaticness (C*) difference (ΔC*) evaluation | | A | A | A | A | A |
| | Jetting stability evaluation | | A | A | A | B | B |
| | Overall evaluation | | G | G | G | G | G |

| | | | EXAMPLES | | | | | |
|---|---|---|---|---|---|---|---|---|
| | | | EX 6 | EX7 | EX8 | EX9 | EX10 | E11 |
| Water-based Ink Set | Water-based Yellow Ink | | Y4 | Y5 | Y7 | Y8 | Y10 | Y11 |
| | Cationic polymer | Type | Polylysine | Polylysine | PAA (trade name) −8 | PAA (trade name) −3 | Polyethyleneimine 1800 | Polyethyleneimine 1800 |
| | | Molecular weight | 4000 | 4000 | 8000 | 3000 | 1800 | 1200 |
| | | Blending amount | 3.0 | 0.5 | 4.0 | 0.5 | 4.0 | 0.5 |
| | Water-based Cyan Ink | | C12 | C12 | C12 | C12 | C12 | C12 |
| | Cationic polymer | Type | — | — | — | — | — | — |
| | | Molecular weight | — | — | — | — | — | — |
| | | Blending amount | — | — | — | — | — | — |
| | Water-based Magenta Ink | | M18 | M18 | M18 | M18 | M18 | M18 |
| | Cationic polymer | Type | — | — | — | — | — | — |
| | | Molecular weight | — | — | — | — | — | — |
| | | Blending amount | — | — | — | — | — | — |

TABLE 5-continued

|  |  |  |  |  |  |  |
|---|---|---|---|---|---|---|
| Glossy paper | A | A | A | A | A | A |
| Chromaticness (C*) difference (ΔC*) evaluation | A | A | A | A | A | A |
| Jetting stability evaluation | A | A | B | A | B | A |
| Overall evaluation | G | G | G | G | G | G |

TABLE 6

|  |  |  | EXAMPLES | | | | |
|---|---|---|---|---|---|---|---|
|  |  |  | EX12 | EX13 | EX14 | EX15 | EX16 |
| Water-based Ink Set | Water-based Yellow Ink | | Y12 | Y12 | Y12 | Y12 | Y12 |
| | Cationic polymer | Type | — | — | — | — | — |
| | | Molecular weight | — | — | — | — | — |
| | | Blending amount | — | — | — | — | — |
| | Water-based Cyan Ink | | C1 | C6 | C9 | C2 | C3 |
| | Cationic polymer | Type | Polylysine | PAA (trade name) -3 | Polyethylene-imine 1200 | Polylysine | Polylysine |
| | | Molecular weight | 4000 | 3000 | 1200 | 4000 | 4000 |
| | | Blending amount | 2.5 | 2.5 | 2.5 | 4.0 | 3.5 |
| | Water-based Magenta Ink | | M18 | M18 | M18 | M18 | M18 |
| | Cationic polymer | Type | — | — | — | — | — |
| | | Molecular weight | — | — | — | — | — |
| | | Blending amount | — | — | — | — | — |
| Glossy paper | | | A | A      C | A | A | A |
| Chromaticness (C*) difference (ΔC*) evaluation | | | A | A      A | A | A | A |
| Jetting stability evaluation | | | A | A | A | B | B |
| Overall evaluation | | | G | G      G | G | G | G |

|  |  |  | EXAMPLES | | | | | |
|---|---|---|---|---|---|---|---|---|
|  |  |  | EX17 | EX18 | EX19 | EX20 | EX21 | EX22 |
| Water-based Ink Set | Water-based Yellow Ink | | Y12 | Y12 | Y12 | Y6 | Y12 | Y12 |
| | Cationic polymer | Type | — | — | — | — | — | — |
| | | Molecular weight | — | — | — | — | — | — |
| | | Blending amount | — | — | — | — | — | — |
| | Water-based Cyan Ink | | C4 | C5 | C7 | C8 | C10 | C11 |
| | Cationic polymer | Type | Polylysine | Polylysine | PAA (trade name) −8 | PAA (trade name) −3 | Polyethylene-imine 1800 | Polyethylene-imine 1200 |
| | | Molecular weight | 4000 | 4000 | 8000 | 3000 | 1800 | 1200 |
| | | Blending amount | 3.0 | 0.5 | 4.0 | 0.5 | 4.0 | 0.5 |
| | Water-based Magenta Ink | | M18 | M18 | M18 | M18 | M18 | M18 |
| | Cationic polymer | Type | — | — | — | — | — | — |
| | | Molecular weight | — | — | — | — | — | — |
| | | Blending amount | — | — | — | — | — | — |
| Glossy paper | | | A | A | A | A | A | A |
| Chromaticness (C*) difference (ΔC*) evaluation | | | A | A | A | A | A | A |
| Jetting stability evaluation | | | A | A | B | A | B | A |
| Overall evaluation | | | G | G | G | G | G | G |

TABLE 7

|  |  |  | EXAMPLES | | | |
|---|---|---|---|---|---|---|
|  |  |  | EX23 | EX24 | EX25 | EX26 |
| Water-based Ink Set | Water-based Yellow Ink | | Y12 | Y12 | Y12 | Y12 |
| | Cationic polymer | Type | — | — | — | — |
| | | Molecular weight | | | | |

TABLE 7-continued

| | | | | | | | |
|---|---|---|---|---|---|---|---|---|
| | | Blending amount | — | | — | — | — | — |
| | Water-based Cyan Ink | | C12 | | C12 | C12 | C12 | C12 |
| | Cationic polymer | Type | — | | — | — | — | — |
| | | Molecular weight | — | | — | — | — | — |
| | | Blending amount | — | | — | — | — | — |
| | Water-based Magenta Ink | | M1 | | M6 | M7 | M12 | |
| | Cationic polymer | Type | Polylysine | | PAA (trade name) −8 | PAA (trade name) −3 | Polyethylene-imine 1800 | |
| | | Molecular weight | 4000 | | 8000 | 3000 | 1800 | |
| | | Blending amount | 2.5 | | 2.5 | 2.5 | 2.5 | |
| Glossy paper | | | A | B | A | A | A | |
| Chromaticness (C*) difference (ΔC*) evaluation | | | A | A | A | A | A | |
| Jetting stability evaluation | | | A | | A | A | A | |
| Overall evaluation | | | G | G | G | G | G | |

| | | | EXAMPLES | | | | |
|---|---|---|---|---|---|---|---|
| | | | EX27 | EX28 | EX29 | EX30 | EX31 |
| Water-based Ink Set | Water-based Yellow Ink | | Y12 | Y12 | Y12 | Y12 | Y12 |
| | Cationic polymer | Type | — | — | — | — | — |
| | | Molecular weight | — | — | — | — | — |
| | | Blending amount | — | — | — | — | — |
| | Water-based Cyan Ink | | C12 | C12 | C12 | C12 | C12 |
| | Cationic polymer | Type | — | — | — | — | — |
| | | Molecular weight | — | — | — | — | — |
| | | Blending amount | — | — | — | — | — |
| | Water-based Magenta Ink | | M13 | M2 | M3 | M4 | M5 |
| | Cationic polymer | Type | Polyethylenei-mine 1200 | Polylysine | Polylysine | Polylysine | Polylysine |
| | | Molecular weight | 1200 | 4000 | 4000 | 4000 | 4000 |
| | | Blending amount | 2.5 | 4.0 | 3.5 | 3.0 | 0.5 |
| Glossy paper | | | A | C | A | A | A | A |
| Chromaticness (C*) difference (ΔC*) evaluation | | | A | A | A | A | A | A |
| Jetting stability evaluation | | | A | | B | B | A | A |
| Overall evaluation | | | G | G | G | G | G | G |

TABLE 8

| | | | EXAMPLES | | | |
|---|---|---|---|---|---|---|
| | | | EX32 | EX33 | EX34 | EX35 |
| Water-based Ink Set | Water-based Yellow Ink | | Y12 | Y12 | Y12 | Y12 |
| | Cationic polymer | Type | — | — | — | — |
| | | Molecular weight | — | — | — | — |
| | | Blending amount | — | — | — | — |
| | Water-based Cyan Ink | | C12 | C12 | C12 | C12 |
| | Cationic polymer | Type | — | — | — | — |
| | | Molecular weight | — | — | — | — |
| | | Blending amount | — | — | — | — |
| | Water-based Magenta Ink | | M8 | M9 | M10 | M11 |
| | Cationic polymer | Type | PAA (trade name) −8 | PAA (trade name) −8 | PAA (trade name) −8 | PAA (trade name) −3 |
| | | Molecular weight | 8000 | 8000 | 8000 | 3000 |
| | | Blending amount | 4.0 | 3.5 | 3.0 | 0.5 |

TABLE 8-continued

|  |  | | | | |
|---|---|---|---|---|---|
| Glossy paper | A | A | A | A | |
| Chromaticness (C*) difference (ΔC*) evaluation | A | A | A | A | |
| Jetting stability evaluation | B | B | A | A | |
| Overall evaluation | G | G | G | G | |

|  |  |  | Example | | | | |
|---|---|---|---|---|---|---|---|
|  |  |  | EX36 | EX37 | EX38 | EX39 | EX40 |
| Water-based Ink Set | Water-based Yellow Ink | | Y12 | Y12 | Y12 | Y12 | Y12 |
| | Cationic polymer | Type | — | — | — | — | Polylysine |
| | | Molecular weight | — | — | — | — | 4000 |
| | | Blending amount | — | — | — | — | 2.5 |
| | Water-based Cyan Ink | | C12 | C12 | C12 | C12 | C12 |
| | Cationic polymer | Type | — | — | — | — | Polylysine |
| | | Molecular weight | — | — | — | — | 4000 |
| | | Blending amount | — | — | — | — | 2.5 |
| | Water-based Magenta Ink | | M14 | M15 | M16 | M17 | M1 |
| | Cationic polymer | Type | Polyethylene-imine 1800 | Polyethylene-imine 1800 | Polyethylene-imine 1800 | Polyethylene-imine 1800 | Polylysine |
| | | Molecular weight | 1800 | 1800 | 1800 | 1200 | 4000 |
| | | Blending amount | 4.0 | 3.5 | 3.0 | 0.5 | 2.5 |
| Glossy paper | | | A | A | A | A | A |
| Chromaticness (C*) difference (ΔC*) evaluation | | | A | A | A | A | A |
| Jetting stability evaluation | | | B | B | A | A | A |
| Overall evaluation | | | G | G | G | G | G |

TABLE 9

|  |  |  | COMPARATIVE EXAMPLES | | | | |
|---|---|---|---|---|---|---|---|
|  |  |  | COM. EX1 | COM. EX2 | COM. EX3 | COM. EX4 | COM. EX5 |
| Water-based Ink Set | Water-based Yellow Ink | | Y12 | Y13 | Y14 | Y15 | Y16 |
| | Cationic polymer | Type | — | Kollidon 12PF | Lysine hydro-chloride | Dimethyl ethyloctyl ammonium ethylsulfate | Polylysine |
| | | Molecular weight | — | 3000 | 146 | 186 | 4000 |
| | | Blending amount | — | 2.5 | 2.5 | 2.5 | 4.5 |
| | Water-based Cyan Ink | | C12 | C12 | C12 | C12 | C12 |
| | Cationic polymer | Type | — | — | — | — | — |
| | | Molecular weight | — | — | — | — | — |
| | | Blending amount | — | — | — | — | — |
| | Water-based Magenta Ink | | M18 | M18 | M18 | M18 | M18 |
| | Cationic polymer | Type | — | — | — | — | — |
| | | Molecular weight | — | — | — | — | — |
| | | Blending amount | — | — | — | — | — |
| Glossy paper | | | A | A | B | A | A |
| Chromaticness (C*) difference (ΔC*) evaluation | | | C | C | C | C | A |
| Jetting stability evaluation | | | A | A | A | A | C |
| Overall evaluation | | | NG | NG | NG | NG | NG |

|  |  |  | COMPARATIVE EXAMPLES | | | | |
|---|---|---|---|---|---|---|---|
|  |  |  | COM. EX6 | COM. EX7 | COM. EX8 | COM. EX9 | COM. EX10 |
| Water-based Ink Set | Water-based Yellow Ink | | Y17 | Y18 | Y19 | Y20 | Y21 |
| | Cationic polymer | Type | Polylysine | PAA (trade name) −8 | PAA (trade name) −3 | Polyethylene-imine 1800 | Polyethylene-imine 1200 |
| | | Molecuar weight | 4000 | 8000 | 3000 | 1800 | 1200 |

TABLE 9-continued

|  |  |  |  |  |  |  |
|---|---|---|---|---|---|---|
|  |  | Blending amount | 0.3 | 4.5 | 0.3 | 4.5 | 0.3 |
|  | Water-based Cyan Ink | | C12 | C12 | C12 | C12 | C13 |
|  | Cationic polymer | Type | — | — | — | — | — |
|  |  | Molecular weight | — | — | — | — | — |
|  |  | Blending amount | — | — | — | — | — |
|  | Water-based Magenta Ink | | M18 | M18 | M18 | M18 | M19 |
|  | Cationic polymer | Type | — | — | — | — | — |
|  |  | Molecular weight | — | — | — | — | — |
|  |  | Blending amount | — | — | — | — | — |
| Glossy paper | | | A | A | A | A | A |
| Chromaticness (C*) difference (ΔC*) evaluation | | | C | A | C | A | C |
| Jetting stability evaluation | | | A | C | A | C | A |
| Overall evaluation | | | NG | NG | NG | NG | NG |

TABLE 10

| | | | COMPARATIVE EXAMPLES | | | |
|---|---|---|---|---|---|---|
| | | | COM. EX11 | COM. EX12 | COM. EX13 | COM. EX14 |
| Water-based Ink Set | Water-based Yellow Ink | | Y12 | Y12 | Y12 | Y12 |
| | Cationic polymer | Type | — | — | — | — |
| | | Molecular weight | — | — | — | — |
| | | Blending amount | — | — | — | — |
| | Water-based Cyan Ink | | C13 | C14 | C15 | C16 |
| | Cationic polymer | Type | Kollidon 12PF | Lysine hydrochloride | Dimethyl ethyloctyl ammonium ethylsulfate | Polylysine |
| | | Molecular weight | 3000 | 146 | 186 | 4000 |
| | | Blending amount | 2.5 | 2.5 | 2.5 | 4.5 |
| | Water-based Magenta Ink | | M18 | M18 | M18 | M18 |
| | Cationic polymer | Type | — | — | — | — |
| | | Molecular weight | — | — | — | — |
| | | Blending amount | — | — | — | — |
| Glossy paper | | | A | A | C | A |
| Chromaticness (C*) difference (ΔC*) evaluation | | | C | C | C | C |
| Jetting stability evaluation | | | A | A | A | C |
| Overall evaluation | | | NG | NG | NG | NG |

| | | | COMPARATIVE EXAMPLES | | | | |
|---|---|---|---|---|---|---|---|
| | | | COM. EX15 | COM. EX16 | COM. EX17 | COM. EX18 | COM. EX19 |
| Water-based Ink Set | Water-based Yellow Ink | | Y12 | Y12 | Y12 | Y12 | Y12 |
| | Cationic polymer | Type | — | — | — | — | — |
| | | Molecular weight | — | — | — | — | — |
| | | Blending amount | — | — | — | — | — |
| | Water-based Cyan Ink | | C17 | C18 | C19 | C20 | C21 |
| | Cationic polymer | Type | Polylysine | PAA (trade name) −8 | PAA (trade name) −3 | Polyethyleneimine 1800 | Polyethyleneimine 1200 |
| | | Molecular weight | 4000 | 8000 | 3000 | 1800 | 1200 |
| | | Blending amount | 0.3 | 4.5 | 0.3 | 4.5 | 0.3 |
| | Water-based Magenta Ink | | M18 | M18 | M18 | M18 | M18 |
| | Cationic polymer | Type | — | — | — | — | — |
| | | Molecular weight | — | — | — | — | — |
| | | Blending amount | — | — | — | — | — |
| Glossy paper | | | A | A | A | A | A |

TABLE 10-continued

| | | | | | |
|---|---|---|---|---|---|
| Chromaticness (C*) difference (ΔC*) evaluation | C | A | C | A | C |
| Jetting stability evaluation | A | C | A | C | A |
| Overall evaluation | NG | NG | NG | NG | NG |

TABLE 11

| | | | COMPARATIVE EXAMPLES | | | |
|---|---|---|---|---|---|---|
| | | | COM. EX20 | COM. EX21 | COM. EX22 | COM. EX23 |
| Water-based Ink Set | Water-based Yellow Ink | | Y12 | Y12 | Y12 | Y12 |
| | Cationic polymer | Type | — | — | — | — |
| | | Molecular weight | — | — | — | — |
| | | Blending amount | — | — | — | — |
| | Water-based Cyan Ink | | C12 | C12 | C12 | C12 |
| | Cationic polymer | Type | — | — | — | — |
| | | Molecular weight | — | — | — | — |
| | | Blending amount | — | — | — | — |
| | Water-based Magenta Ink | | M19 | M20 | M21 | M22 |
| | Cationic polymer | Type | Kollidon 12PF | Lysine hydrochloride | Dimethyl ethyloctyl ammonium ethylsulfate | Polylysine |
| | | Molecular weight | 3000 | 146 | 186 | 4000 |
| | | Blending amount | 2.5 | 2.5 | 2.5 | 4.5 |
| Glossy paper | | | A    C | A | A    B | A |
| Chromaticness (C*) difference (ΔC*) evaluation | | | C    C | C | C    C | A |
| Jetting stability evaluation | | | A | A | A | C |
| Overall evaluation | | | NG    NG | NG | NG    NG | NG |

| | | | COMPARATIVE EXAMPLES | | | | |
|---|---|---|---|---|---|---|---|
| | | | COM. EX24 | COM. EX25 | COM. EX26 | COM. EX27 | COM. EX28 |
| Water-based Ink Set | Water-based Yellow Ink | | Y12 | Y12 | Y12 | Y12 | Y12 |
| | Cationic polymer | Type | — | — | — | — | — |
| | | Molecular weight | — | — | — | — | — |
| | | Blending amount | — | — | — | — | — |
| | Water-based Cyan Ink | | C12 | C12 | C12 | C12 | C12 |
| | Cationic polymer | Type | — | — | — | — | — |
| | | Molecular weight | — | — | — | — | — |
| | | Blending amount | — | — | — | — | — |
| | Water-based Magenta Ink | | M23 | M24 | M25 | M26 | M27 |
| | Cationic polymer | Type | Polylysine | PAA (trade name) -8 | PAA (trade name) -3 | Polyethyleneimine 1800 | Polyethyleneimine 1200 |
| | | Molecular weight | 4000 | 8000 | 3000 | 1800 | 1200 |
| | | Blending amount | 0.3 | 4.5 | 0.3 | 4.5 | 0.3 |
| Glossy paper | | | A | A | A | A | A |
| Chromaticness (C*) difference (ΔC*) evaluation | | | C | A | C | A | C |
| Jetting stability evaluation | | | A | C | A | C | A |
| Overall evaluation | | | NG | NG | NG | NG | NG |

As shown in Tables 5 to 8, in Examples 1 to 40, the change of the chromaticness (C*) of the tri-color black patch was suppressed in the low temperature-high humidity environment and the jetting stability was excellent. The water-based ink sets of Examples 1 to 22 each satisfy the condition (I) described above; the water-based ink sets of Examples 23 to 39 each satisfy the condition (II) described above; and Example 40 satisfies both of the conditions (I) and (II). In Examples 1-3, 6, 7, 9, 11-14, 17, 18, 20, 22-27, 30, 31, 34, 35 and 38-40 in each of which the blending amount of the cationic polymer with respect to the total amount of the water-based ink blended with the cationic polymer was in the range of 0.5% by weight to 3% by weight, the jetting stability was particularly excellent.

As shown in Tables 9-11, on the other hand, in Comparative Example 1 in which the water-based ink containing the cationic polymer was not used, the filling effect was not expressed, and the great change was caused in the chromaticness (C*) of the tri-color black patch in the low temperature-high humidity environment. Also in Comparative Examples 2-4, 11-13 and 20-22 each of which used the water-based ink containing polyvinyl pyrrolidone as a non-cationic polymer or lysine hydrochloride or dimethyl ethyloctyl ammonium ethylsulfate as a cationic low molecular weight substance, instead of using the cationic polymer, the filling effect was not expressed, and the great change was caused in the chromaticness (C*) of the tri-color black patch in the low temperature-high humidity environment.

Further, in Comparative Examples 5, 7, 9, 14, 16, 18, 23, 25 and 27 in each of which the blending amount of the cationic polymer with respect to the total amount of the water-based ink blended with the cationic polymer was 4.5% by weight, the jetting stability was inferior. Furthermore, in Comparative Examples 6, 8, 10, 15, 17, 19, 24, 26 and 28 in each of which the blending amount of the cationic polymer with respect to the total amount of the water-based ink blended with the cationic polymer was 0.3% by weight, the filling effect was not expressed, and the great change was caused in the chromaticness (C*) of the tri-color black patch in the low temperature-high humidity environment.

Note that although only the water-based magenta ink contains the dye represented by the general formula (1) in the ink set of Examples 1-40, the water-based ink set of the present teaching is not limited to this. It is allowable to use, in the water-based cyan ink or water-based yellow ink, the dye represented by the general formula (1) together with a dye which is different from the dye represented by the general formula (1). Alternatively, it is also allowable to use the dye represented by the general formula (1) in two or more kinds of water-based inks among the water-based inks constructing the ink set.

Further, although only the water-based magenta ink contains both of the cationic polymer and the dye represented by the general formula (1) in the ink set of Examples 23-40, the water-based ink set of the present teaching is not limited to this. It is allowable that the water-based cyan ink or water-based yellow ink contains both of the cationic polymer and the dye represented by the general formula (1). Alternatively, it is also allowable that two or more kinds of water-based inks among the water-based inks constructing the ink set contain both of the cationic polymer and the dye represented by the general formula (1).

As described above, the water-based ink set of the present teaching provides the satisfactory hue, and the ink set is excellent in the durability or stoutness against light, heat, and ozone, wherein the color change of the secondary color on the recording medium is suppressed in the high humidity environment. The way of use of the water-based ink set of the present teaching is not specifically limited, and water-based ink set is widely applicable to various types of ink-jet recording.

What is claimed is:
1. A water-based ink set for ink-jet recording, comprising at least two kinds of water-based inks each of which contains a colorant, water, and a water-soluble organic solvent;
wherein at least one water-based ink, among the at least two kinds of water-based inks, contains a dye represented by a general formula (1) as the colorant, and at least one water-based ink, among the at least two kinds of water-based inks, contains 0.5% by weight to 4% by weight of a cationic polymer, and weight average molecular weight of the cationic polymer is not less than 1200:

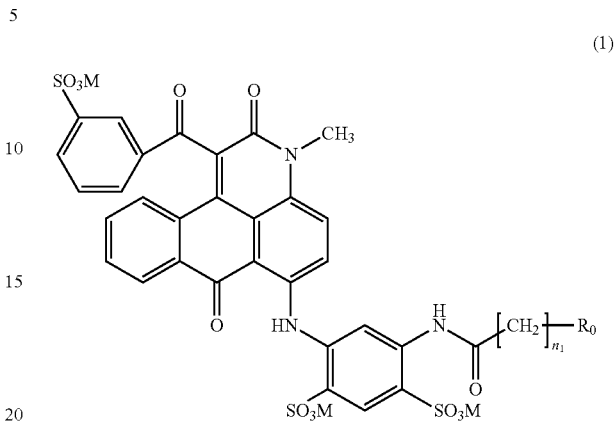

in the general formula (1):
$n_1$ is 1 or 2,
each of three Ms is sodium or ammonium and the three Ms may be same or different from one another, and
$R_0$ represents a monoalkylamino group substituted by a carboxyl group and having a number of carbon atoms of 1 to 8.

2. The water-based ink set for ink jet recording according to claim 1, wherein the at least one water-based ink containing the dye represented by the general formula (1) is same as the at least one water-based ink containing the cationic polymer.

3. The water-based ink set for ink jet recording according to claim 1, wherein the at least one water-based ink containing the dye represented by the general formula (1) is different from the at least one water-based ink containing the cationic polymer.

4. The water-based ink set for ink jet recording according to claim 1, which satisfies at least one of following conditions (I) and (II):
condition (I): the dye represented by the general formula (1) is contained in at least one water-based ink among the two or more kinds of water-based inks; and the cationic polymer is contained in at least one different water-based ink, among the two or more kinds of water-based inks, which is different from the at least one water-based ink containing the dye represented by the general formula (1);
condition (II): both the dye represented by the general formula (1) and the cationic polymer are contained in a same water-based ink among the two or more kinds of water-based inks.

5. The water-based ink set for ink jet recording according to claim 1, wherein the at least one water-based ink containing the cationic polymer contains 0.5% by weight to 3% by weight of the cationic polymer.

6. The water-based ink set for ink jet recording according to claim 1, wherein the cationic polymer is at least one compound selected from a group consisting of a compound represented by a general formula (2), a compound represented by a general formula (3), a compound represented by a general formula (4), and a compound represented by the general formula (5):

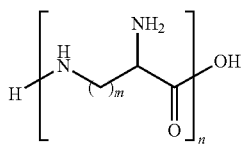
(2)

in the general formula (2), m is an integer of 2 to 6, and n is an integer of 20 to 40;

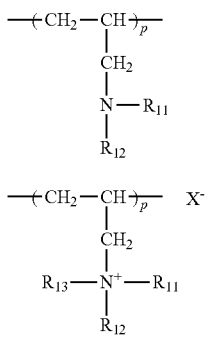
(3)
(4)

in the general formulas (3) and (4), each of $R_{11}$ to $R_{13}$ is a hydrogen atom or an organic group;
in the general formula (4), $X^-$ is an anion; and

(5)

in the general formula (5), q is a positive integer.

7. The water-based ink set for ink jet recording according to claim 6, wherein the cationic polymer is at least one compound selected from a group consisting of polylysine, polyallylamine and polyethyleneimine.

8. The water-based ink set for ink jet recording according to claim 6, wherein the cationic polymer is polylysine.

9. The water-based ink set for ink jet recording according to claim 6, wherein the cationic polymer is polyallylamine.

10. The water-based ink set for ink jet recording according to claim 6, wherein the cationic polymer is polyethyleneimine.

11. An ink jet recording method for performing recording on a recording medium, the method comprising:
preparing the water-based ink set for ink jet recording as defined in claim 1; and
discharging, onto the recording medium, a water-based ink of the water-based ink set.

12. The ink jet recording method according to claim 11, wherein the at least one water-based ink containing the cationic polymer is discharged onto the recording medium, and then the at least one water-based ink containing the dye represented by the general formula (1) is discharged onto the recording medium.

13. The ink jet recording method according to claim 11, wherein the recording medium is a glossy paper having silica particles on a surface thereof.

14. An ink jet recording apparatus which performs recording on a recording medium, the apparatus comprising:
an ink-set accommodating section which accommodates the water-based ink set as defined in claim 1; and
an ink discharging mechanism which discharges, onto the recording medium, a water-based ink of the water-based ink set.

15. The water-based ink set for ink jet recording according to claim 1, wherein the weight average molecular weight of the cationic polymer is 1200 to 5000.

16. The water-based ink set for ink jet recording according to claim 1, wherein the cationic polymer is polylysine or polyallylamine, and
the blending amount of the cationic polymer and the weight average molecular weight of the cationic polymer fulfill the following formula (A):

$X \times Y = 1500$ to $12000$ (A)

in the formula (A):
X: the blending amount of the cationic polymer (% by weight)
Y: the weight average molecular weight of the cationic polymer.

* * * * *